United States Patent
Khirallah et al.

(10) Patent No.: US 11,711,841 B2
(45) Date of Patent: Jul. 25, 2023

(54) ON-DEMAND SYSTEM INFORMATION BROADCASTING SYSTEM

(71) Applicant: NEC Corporation, Tokyo (JP)

(72) Inventors: Chadi Khirallah, Tokyo (JP); Yassin Aden Awad, Tokyo (JP); Yuhua Chen, Tokyo (JP); Robert Arnott, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/476,169

(22) PCT Filed: Dec. 19, 2017

(86) PCT No.: PCT/JP2017/045488
§ 371 (c)(1),
(2) Date: Jul. 5, 2019

(87) PCT Pub. No.: WO2018/128075
PCT Pub. Date: Jul. 12, 2018

(65) Prior Publication Data
US 2019/0357227 A1 Nov. 21, 2019

(30) Foreign Application Priority Data
Jan. 6, 2017 (GB) ..................... 1700267

(51) Int. Cl.
*H04W 72/08* (2009.01)
*H04L 12/947* (2013.01)
(Continued)

(52) U.S. Cl.
CPC ........... *H04W 72/542* (2023.01); *H04L 49/25* (2013.01); *H04W 72/23* (2023.01)

(58) Field of Classification Search
CPC ............ H04W 72/04; H04W 72/0446; H04W 72/0453; H04W 88/08; H04W 76/00;
(Continued)

(56) References Cited

U.S. PATENT DOCUMENTS

2016/0234759 A1  8/2016  Kubota et al.
2017/0265165 A1* 9/2017  Li .................. H04W 48/14
(Continued)

FOREIGN PATENT DOCUMENTS

CN  104349420 A  2/2015
CN  105204949 A  12/2015
(Continued)

OTHER PUBLICATIONS

Office Action dated Feb. 6, 2020 in European Application No. 17829722.2.
(Continued)

*Primary Examiner* — Awet Haile
(74) *Attorney, Agent, or Firm* — Sughrue Mion, PLLC

(57) ABSTRACT

A communication system is disclosed in which a base station manages the transmission of on-demand system information to optimise the trade-off between the additional signalling overhead associated with on-demand transmission and the resource usage inefficiencies associated with the sometimes unnecessary transmission of system information on a periodic basis. The base station manages switching from on-demand transmission to periodic transmission, and vice versa, based on one or more utilisation thresholds.

7 Claims, 15 Drawing Sheets

(51) Int. Cl.
*H04W 72/04* (2023.01)
*H04W 72/542* (2023.01)
*H04L 49/25* (2022.01)
*H04W 72/23* (2023.01)

(58) Field of Classification Search
CPC . H04W 48/12; H04W 72/042; H04W 72/085; H04B 7/2643; H04B 7/2656; H04L 1/189; H04L 1/1887; H04L 49/25
See application file for complete search history.

(56) References Cited

U.S. PATENT DOCUMENTS

| | | | | |
|---|---|---|---|---|
| 2018/0124601 | A1* | 5/2018 | Vutukuri | H04W 12/08 |
| 2018/0132168 | A1* | 5/2018 | Ingale | H04W 72/042 |
| 2019/0174398 | A1* | 6/2019 | Geng | H04W 72/005 |
| 2019/0297562 | A1* | 9/2019 | Wei | H04W 72/14 |

FOREIGN PATENT DOCUMENTS

| | | | |
|---|---|---|---|
| WO | 2015/139330 | A1 | 9/2015 |
| WO | 2016/130353 | A2 | 8/2016 |
| WO | 2016/130354 | A1 | 8/2016 |
| WO | 2016/130355 | A1 | 8/2016 |
| WO | 2016/149026 | A1 | 9/2016 |

OTHER PUBLICATIONS

ZTE et al., "Consideration on the Other SI delivery in NR", 3GPP TSG-RAN WG2 Meeting #95bis, R2-166343, Oct. 10-14, 2016 (6 pages total).

Huawei, et al., "Further Considerations of 'Other SI'", 3GPP TSG-RAN2 Meeting #96, R2-167580, Nov. 14-18, 2016 (6 pages total).

"3rd Generation Partnership Project; Technical Specification Group Radio Access Network; Study on New Radio Access Technology; Radio Interface Protocol Aspects (Release 14)", 3GPP TR 38.804, V0.4.0, Dec. 1, 2016, pp. 1-30.

"Further considerations on other SI", 3GPP Draft, R2-168750, Nov. 13, 2016, pp. 1-6.

International Search Report for PCT/JP2017/045488 dated May 24, 2018 [PCT/ISA/210].

Great Britain Search Report for GB1700267.6 dated Jun. 20, 2017.

Communication dated Aug. 11, 2020, issued by the Japanese Patent Office in application No. 2019-537014.

Samsung (Email Rapporteur), "Report of email discussion: [95#29][NR] On demand SI", 3GPP TSG-RAN WG295bis, Kaohsiung, Taiwan, Oct. 10-14, 2016, R2-166497, pp. 1-20.

Chinese Office Action for CN Application No. 201780088051.6 dated Feb. 9, 2021 with English Translation.

* cited by examiner

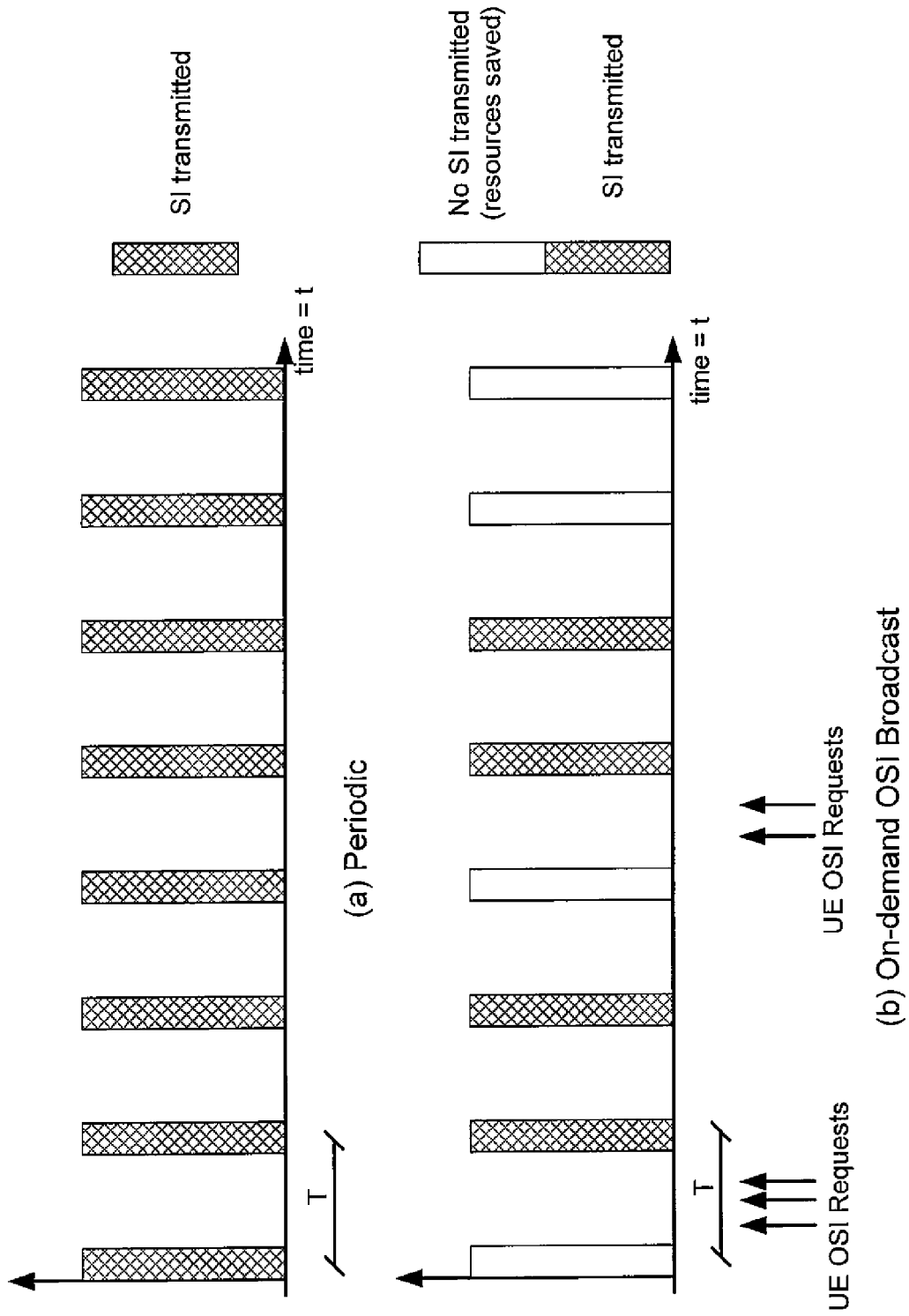
[Fig. 1]

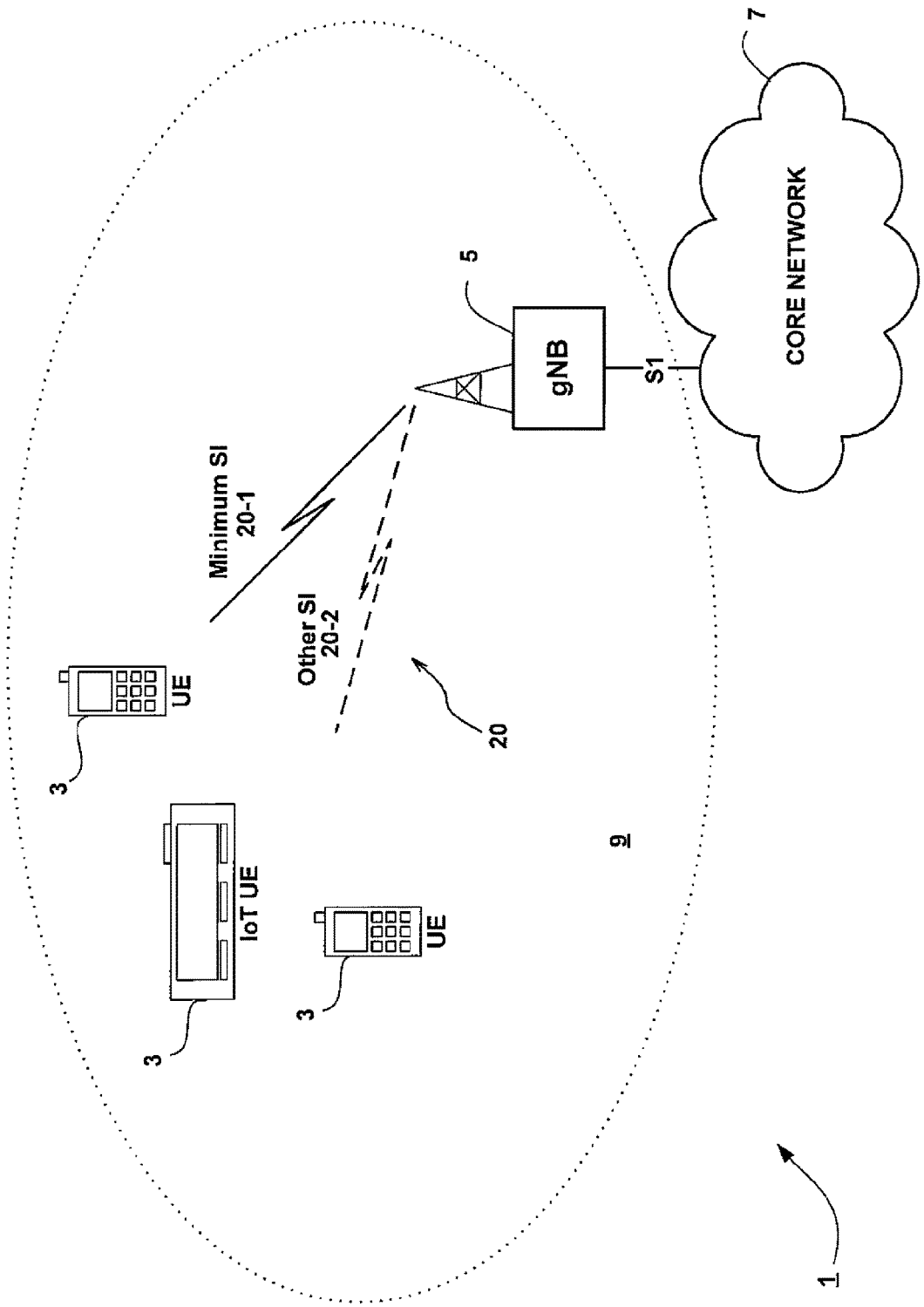
[Fig. 2]

[Fig. 3]
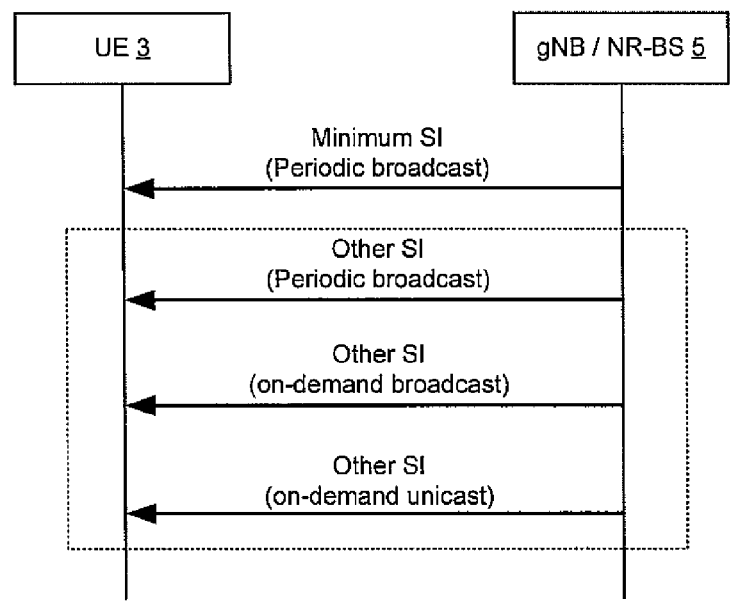

[Fig. 4]
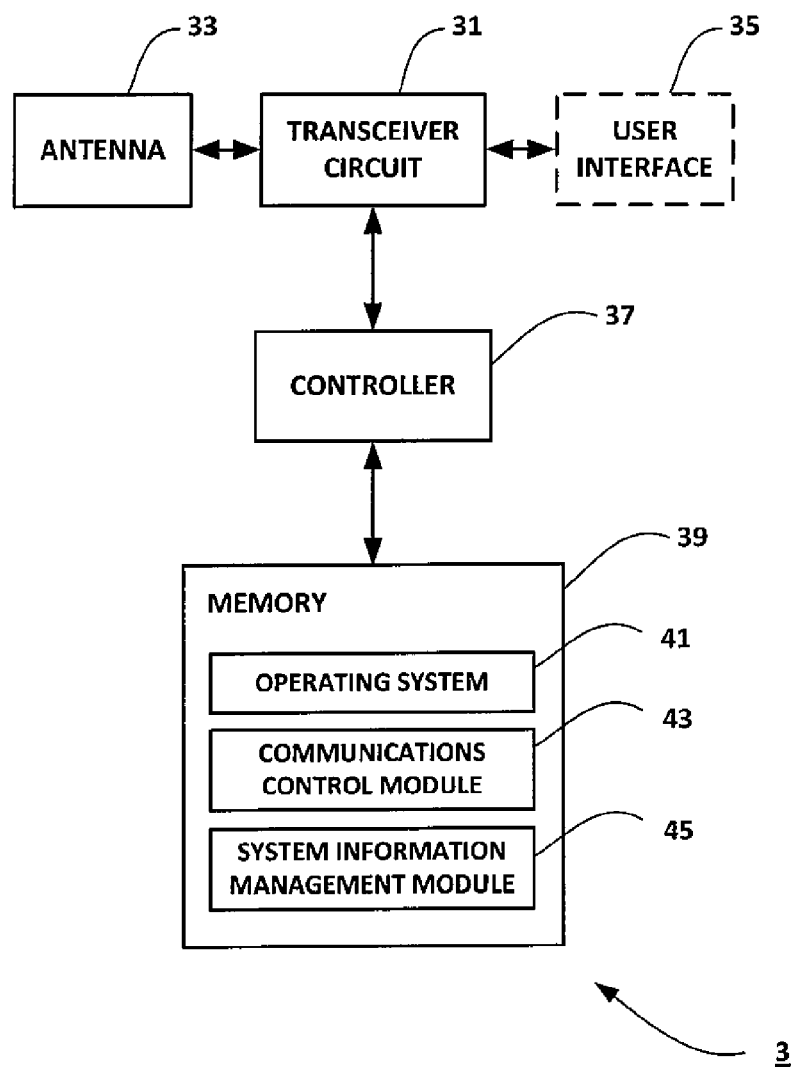

[Fig. 5]
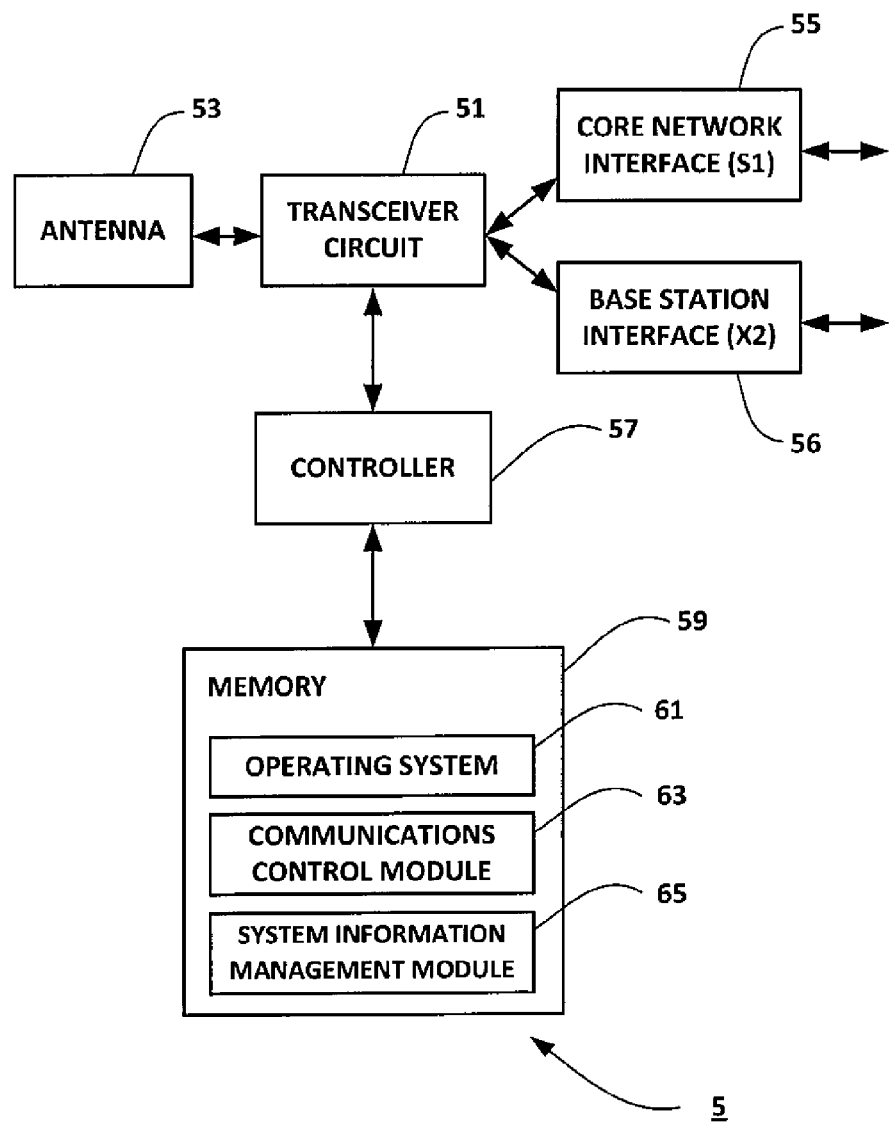

[Fig. 6]
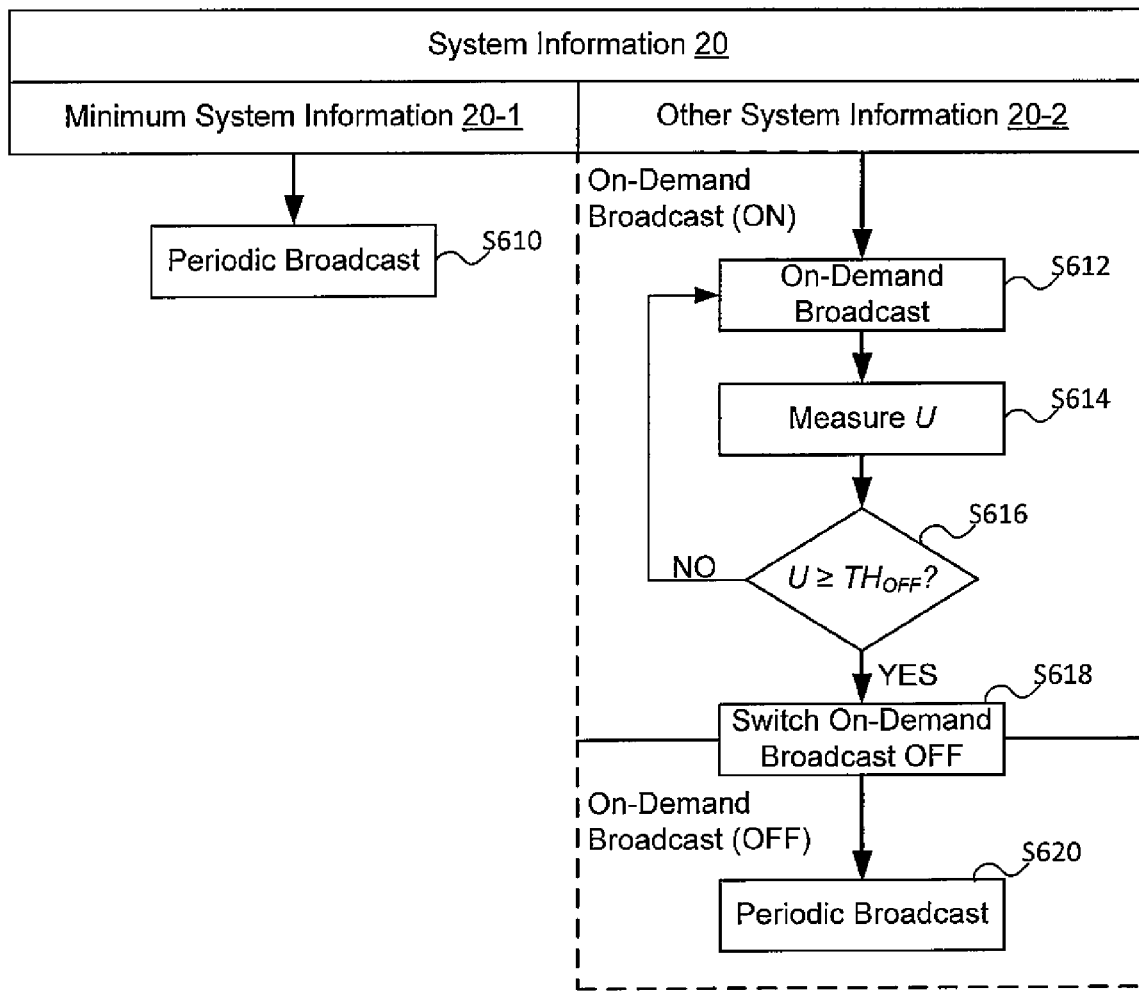

[Fig. 7]
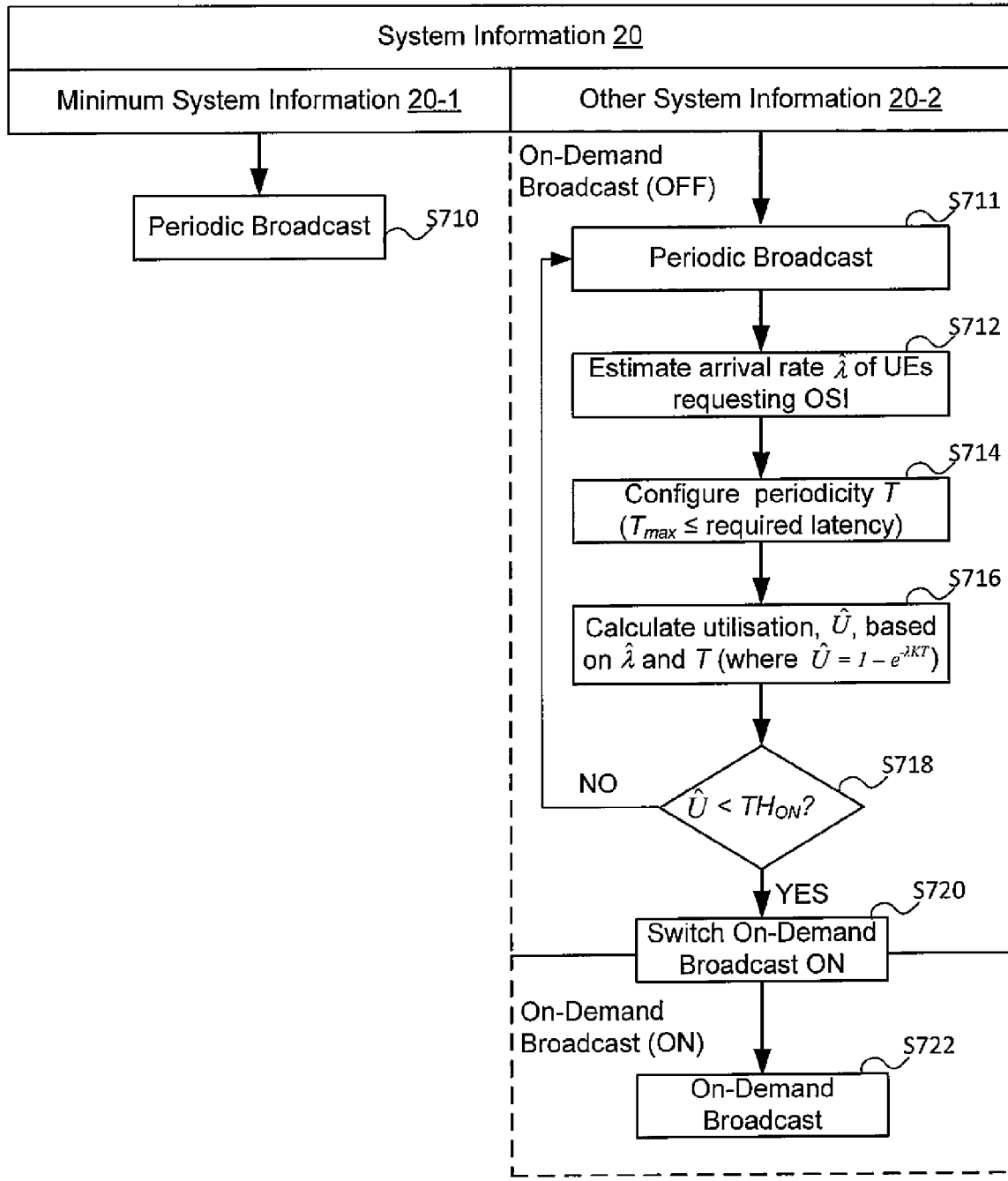

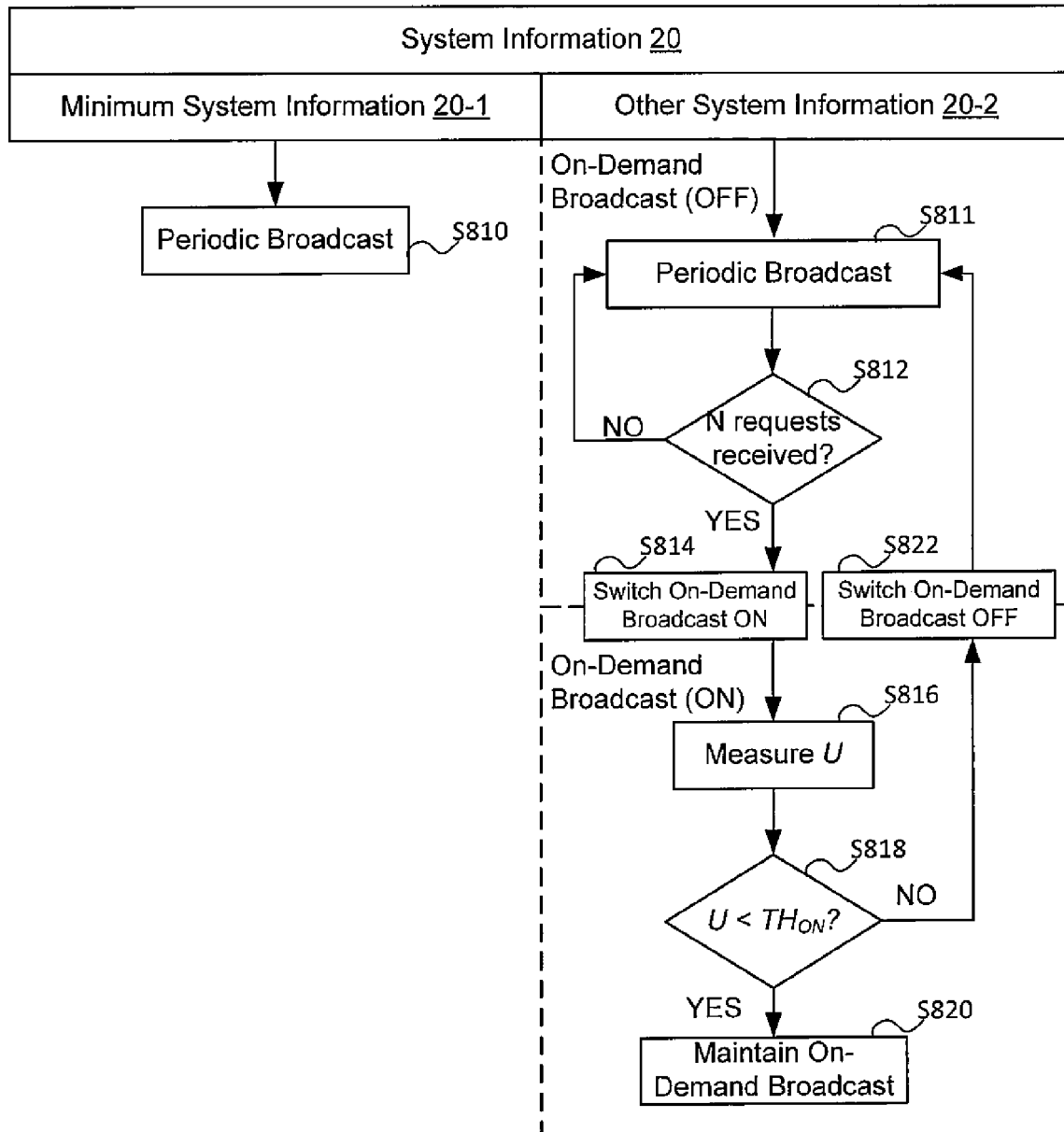
[Fig. 8]

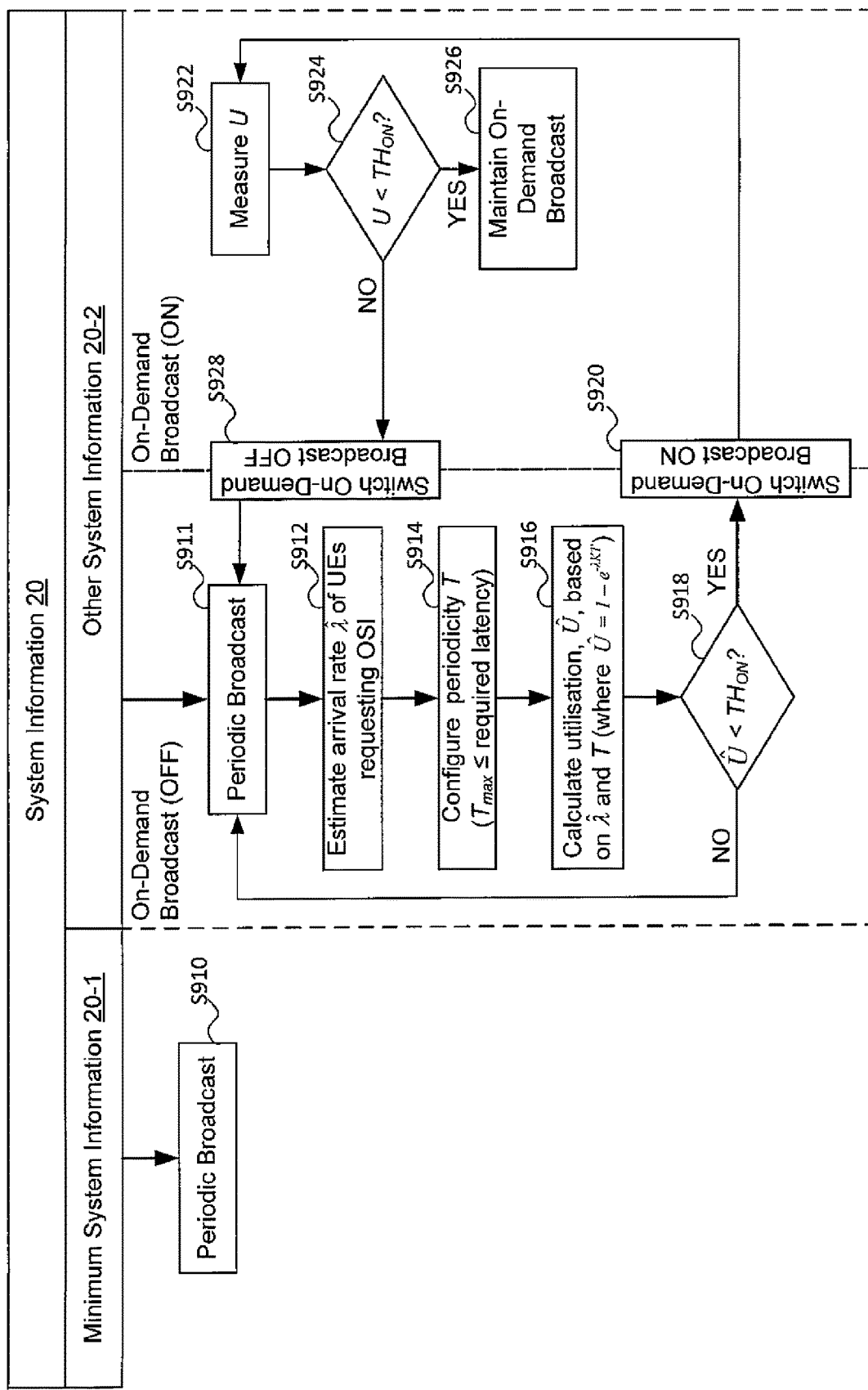
[Fig. 9]

[Fig. 10]
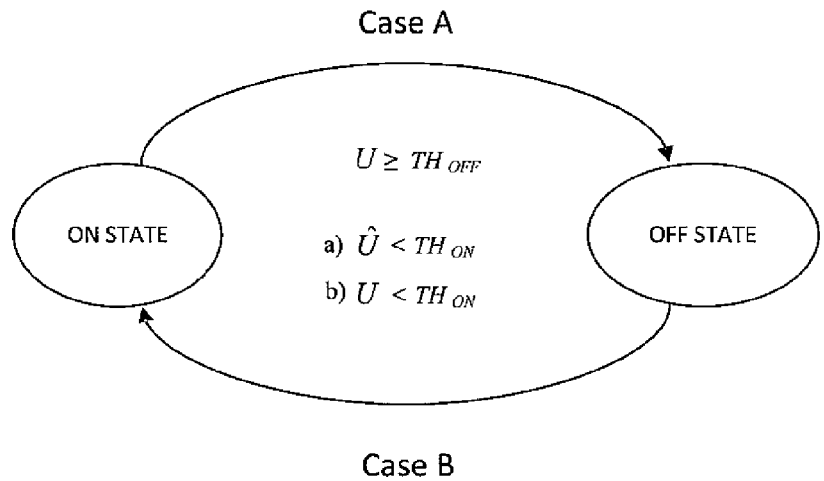
[Fig. 11]
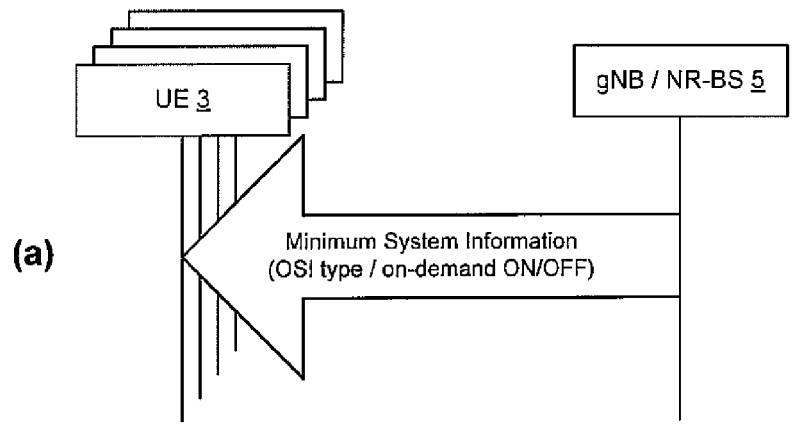
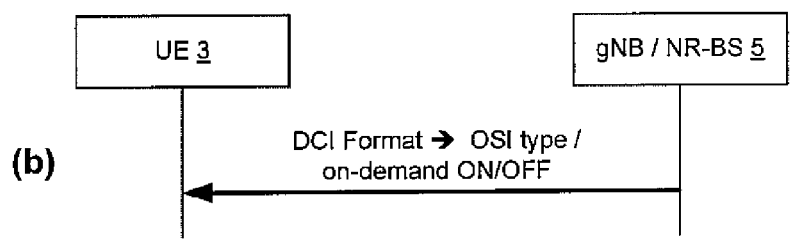

[Fig. 12]
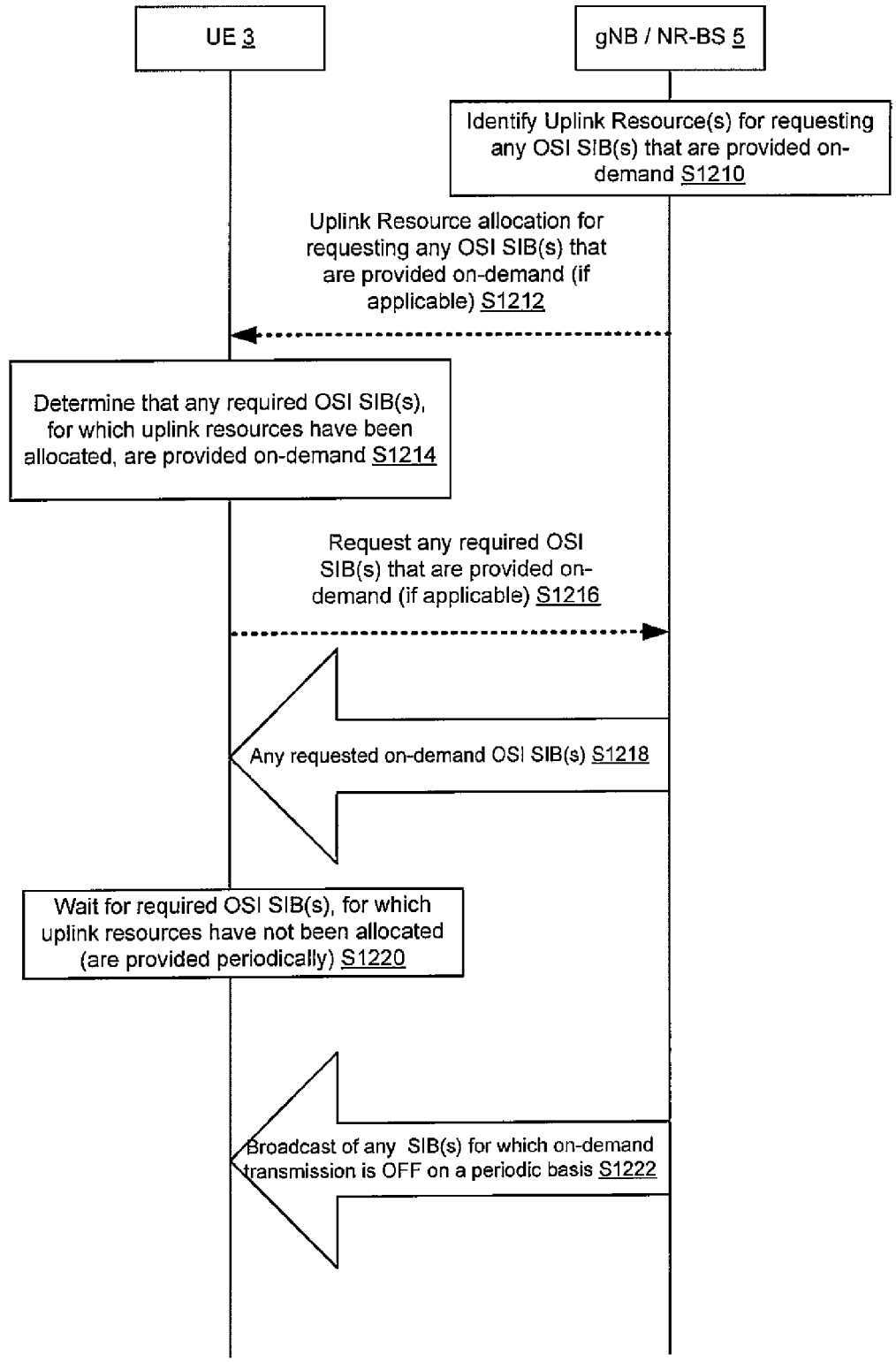

[Fig. 13]
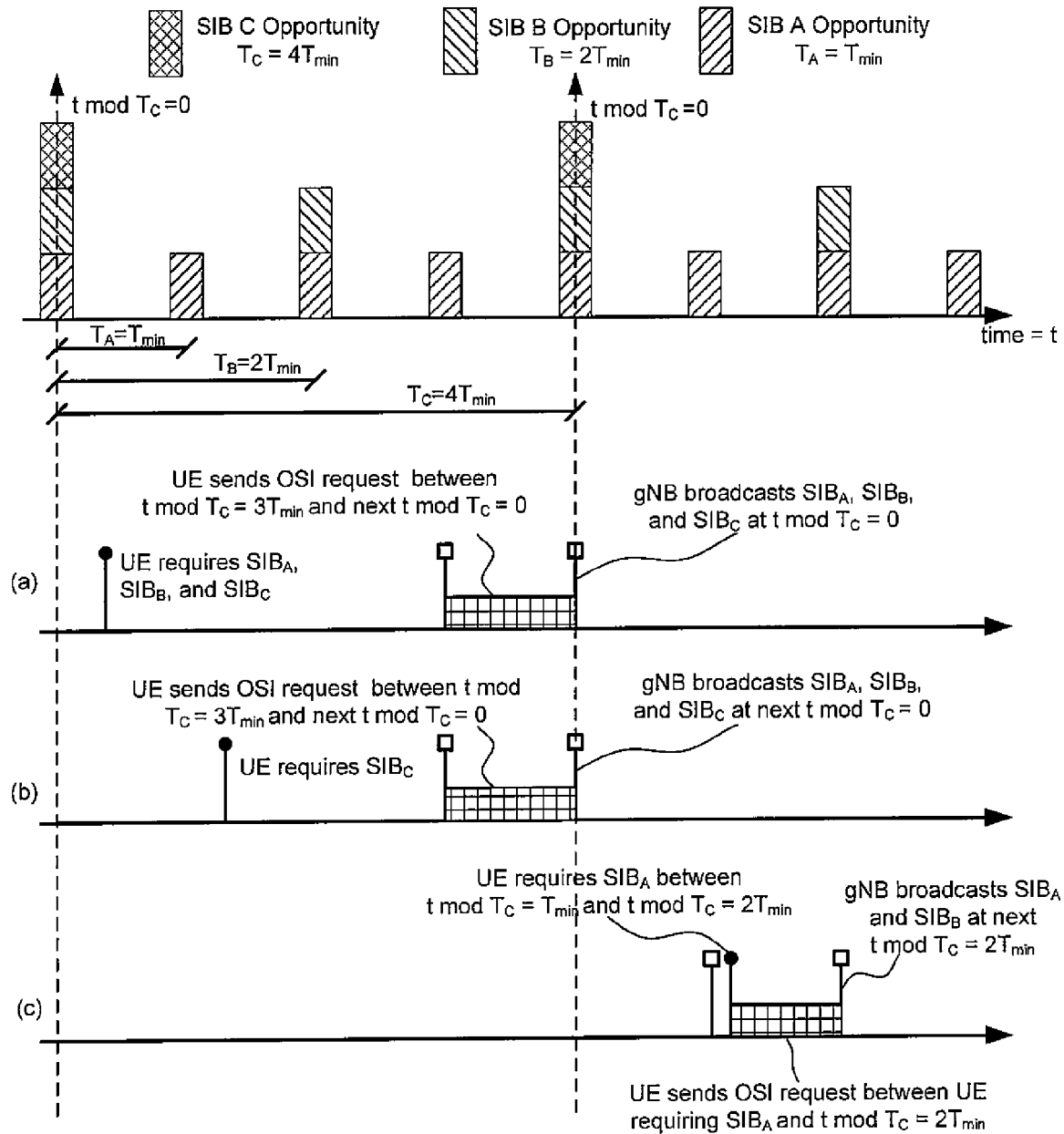

[Fig. 14]
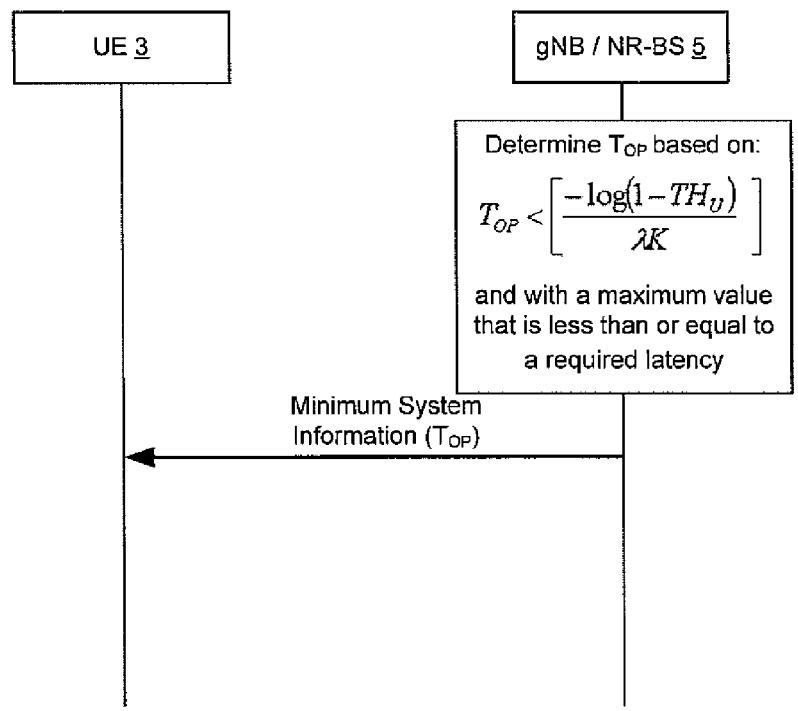

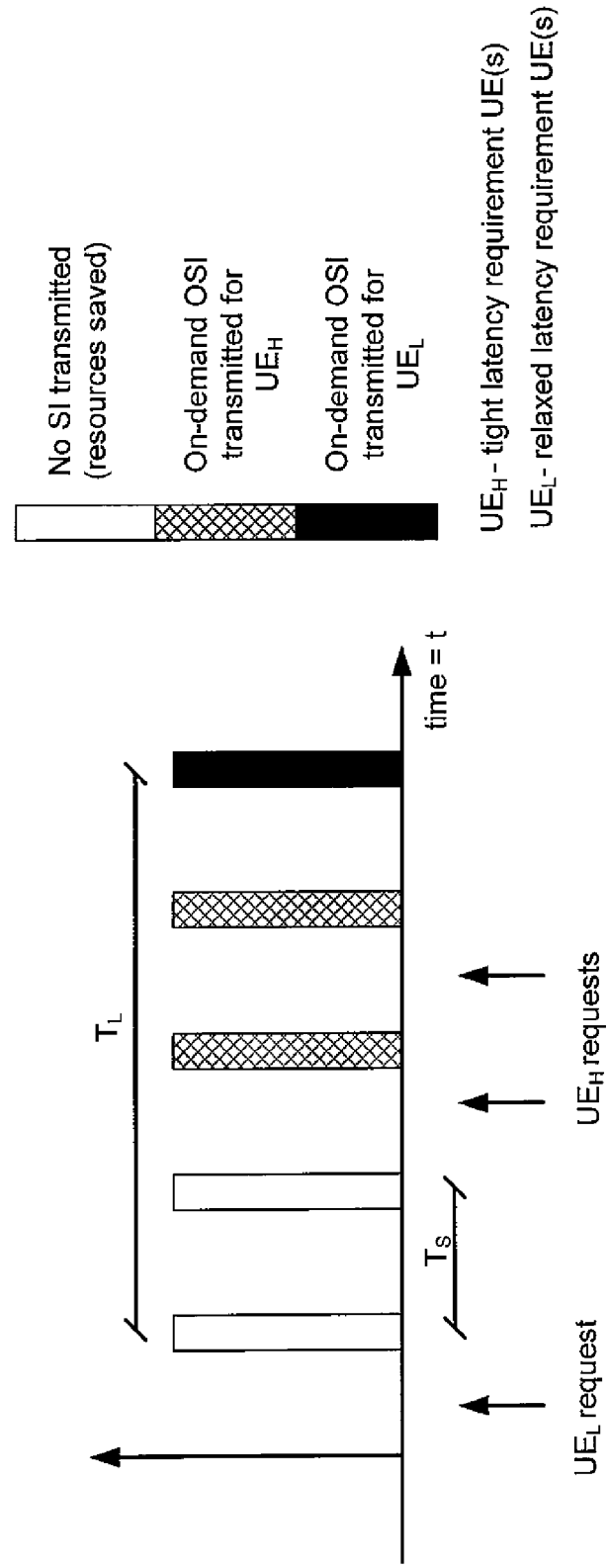
[Fig. 15]

[Fig. 16]
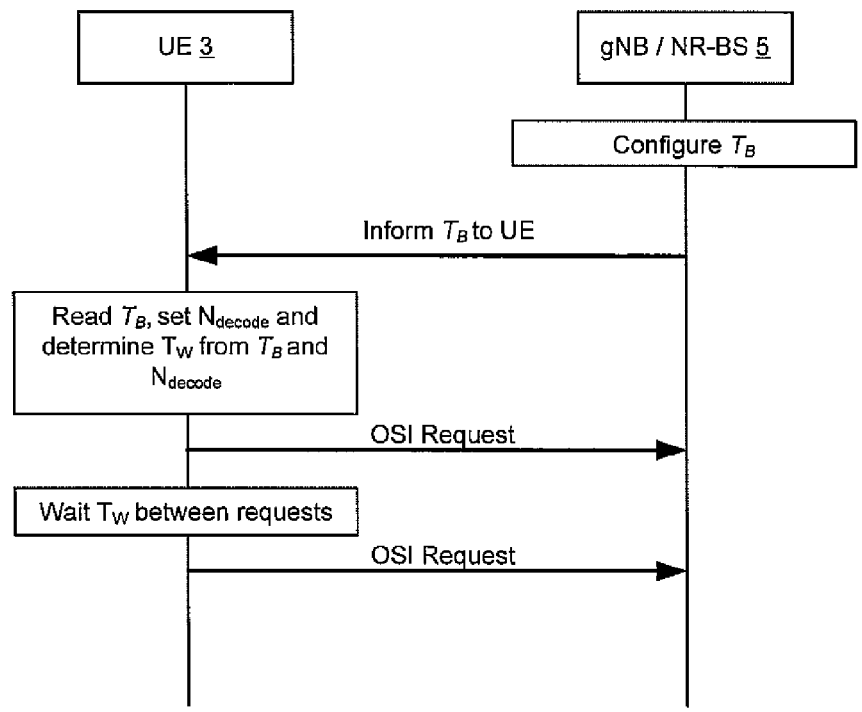

ON-DEMAND SYSTEM INFORMATION BROADCASTING SYSTEM

TECHNICAL FIELD

The present invention relates to the provision of system information in a cellular or wireless telecommunications network, and particularly but not exclusively to optimising the provision of system information from a base station to user equipment in an on-demand or periodic manner. The invention has particular but not exclusive relevance to wireless telecommunications networks implemented according to various standards defined by the 3rd Generation Partnership Project (3GPP). For example, the invention has relevance to Long Term Evolution (LTE) networks, LTE Advanced (LTE-A) networks, related enhancements to and developments of LTE/LTE-A, and to the more recent development of communication technologies beyond LTE/LTE-A into so-called '5G' or 'new radio' (NR) technologies.

BACKGROUND ART

The terms '5G' and 'new radio' (NR) refer to an evolving communication technology that is expected to support a variety of applications and services such as Machine Type Communications (MTC), Internet of Things (IoT) communications, vehicular communications and autonomous cars (V2V/V2X), high resolution video streaming, smart city services, and/or the like. Accordingly, 5G/NR technologies are expected to enable network access to vertical markets and support network sharing for offering networking services to third parties and creating new business opportunities.

Cellular communication networks generally comprise one or more radio access networks (RAN) that provide items of user equipment (UEs) in at least one discrete geographic region (a cell) covered by the RAN, with access to the communication network, to allow the UEs to communicate with one another and to receive (or provide) one or more communication services to one another. The RAN typically comprises a base station which is configured to communicate with the UEs in an associated cell over an air-interface and with communication entities (or 'functions') in a core network (usually over a wired interface) in order to facilitate the set up and maintenance of communication sessions for individual UEs (e.g. for voice/video calls, data services etc.).

Whilst a base station of a 5G/NR communication system is commonly referred to as a New Radio Base Station ('NR-BS') or as a 'gNB' it will be appreciated that they may be referred to using the term, eNB (or 5G/NR eNB) which is more typically associated with LTE base stations. The term 'base station' will be used herein to refer generally to an NR-BS, gNB, eNB or any equivalent communication device of a RAN.

In 5G, and for IoT in particular, it is expected that, for many use cases, there will be a trade-off between efficient power saving modes and low-latency system access (sometimes referred to as the UE sleeping problem). In order to address the sleeping problem a novel state model for 5G RANs that relies on a new state (which has been referred to as the "connected inactive" state) where both the UE and the network keep some context information while the UE sleeps.

One of the tasks of a base station is the provision of the key information required by the UE to communicate in the cellular communication system, access particular services, and move as seamlessly as possible between cells of the same and different radio access technologies (RATs). This information is known as 'system information' and includes, amongst other information, information to allow the UE to access a cell and perform cell selection/re-selection (including information related to INTRA-frequency, INTER-frequency and INTER-RAT cell selections).

Elements of system information are typically grouped into a number of dedicated system information blocks, depending on the type of information. The blocks include a Master Information Block (MIB) comprising static, generally cell specific, information and a number of additional system information blocks (SIBs) representing information that may be different for different UEs (or groups of UEs). The MIB contains, for example, the downlink bandwidth of the cell, Physical Hybrid-ARQ Indicator Channel (PHICH) configuration and the System Frame Number (SFN). The MIB is broadcast on the Physical Broadcast Channel (PBCH), while SIBs are sent on the Physical Downlink Shared Channel (PDSCH) through Radio Resource Control (RRC) messages. SIB1 is carried by "SystemInformationBlockType 1" message. SIB2 and other SIBs are carried by "SystemInformation (SI)" message. An SI message can contain one or several SIBs.

Whilst some system information provided may be required by all UEs in a cell and may need to be transmitted on a relatively regular basis, other system information may not be required by all UEs in the cell at a given time and or may not need to be sent on such a regular basis. Accordingly, in order to help facilitate differential treatment of such system information the system information is divided conceptually into two different types—minimum system information and other system information (OSI).

The minimum system information includes a subset of the information blocks (e.g. the MIB, SIB1, SIB2) carrying a 'minimum' set of information elements (e.g. those elements required to support cell selection, acquiring OSI, or accessing the cell). The OSI comprises all the system information in the other SIBs. Historically, both the minimum and other system information was broadcast on a periodic basis, albeit that the OSI SIBs could be broadcast with a longer period between broadcasts (as configured by the minimum system information—e.g. SIB1).

Referring to the minimum system information, each cell on which a given UE is allowed to camp will have a base station that broadcasts at least some of the minimum system information. There may, however, be cells in the wider cellular network system on which the UE cannot camp and the base station of which does not broadcast the minimum system information. Nevertheless, when a UE considers another cell/frequency for camping on, the UE should, ideally, not be required to acquire minimum system information from the other cell/frequency layer (although this does not preclude the possibility of reception via SFN that has recently been proposed or the UE applying, in full or in part, stored system information from one or more previously visited cells). If a UE cannot determine the full minimum system information of a cell (e.g. by receiving it from the base station operating that cell or from valid stored information from one or more previous cells), the UE will, effectively, treat that cell as having been barred. In this regard it will be appreciated that it is desirable for the UE to know relatively quickly whether it may or may not camp on a given cell.

Referring to the OSI, it has been proposed that both network triggered and UE initiated mechanisms for OSI delivery should be considered and, specifically, to allow the OSI SIBs to be broadcast, or unicast (provisioned in a dedicated manner) 'on-demand' at the request of one or more UEs. Minimum system information, in this case, would still be broadcast on a periodic basis as before with the network (e.g. base station) deciding whether the OSI should be broadcast or delivered through UE-specific (unicast) signalling. For on-demand system information, when triggered, the OSI SIBs may be broadcasted at a configurable periodicity (e.g. equivalent to the SI period in LTE) and for a certain duration. Ideally, however, any request of the OSI by UE in an idle or the new state should be performed without state transition (for example without entering a radio resource control (RRC) connected state). For UEs in an RRC connected state, dedicated RRC signalling can be used for the request and delivery of OSI.

When system information is required by a UE, the UE should be able to determine whether that system information is available in the cell in which the UE is currently located and whether or not the system information is broadcast before the UE sends a request for the required OSI (for example by checking the minimum system information). The minimum system information broadcast in a given cell should provide information on the OSI available in that cell, including scheduling information for OSI SIBs. The scheduling information for the OSI typically includes SIB type, validity information, periodicity, and SI-window information. The UE checks the scheduling information of the OSI provided in the minimum system information to detect whether a specific SIB is being broadcast or not. The SI transmission window used in LTE may also be the baseline for the system information transmission for 5G/NR communication systems.

The UE may request OSI at any suitable juncture. Typically, for example, the UE will request OSI when the cell changes (e.g. handover), when the UE has interest in a particular service (e.g., MBMS, MTC) and/or just before UE connection in a cell. The request may be made in any suitable form, for example, using a common random access channel (RACH) preamble.

The use of on-demand broadcast of system information promises resource saving benefits, compared to (legacy) periodic broadcasts triggered by the base station without UE involvement, because it allows resources that would otherwise be used for OSI broadcasts to be saved when there are no UEs that require the OSI in the relevant cell. This is illustrated in FIG. 1 which illustrates a comparison between periodic broadcasts (FIG. 1(a)) and on-demand broadcasts (FIG. 1(b)). In the example of FIG. 1(a), the base station is configured to trigger the broadcast of OSI periodically (with a periodicity of T) at every periodic opportunity regardless of whether there is a UE that requires any of the OSI in that cell or not. Contrastingly, in the example of FIG. 1(b), whilst the base station is provided with a periodic opportunity (with the same periodicity of T as in FIG. 1(a)) to broadcast OSI, the base station only triggers the broadcast of OSI in a cell following a request from one or more UEs in that cell, for on-demand OSI broadcast, in a preceding period T. Accordingly, when no UEs have requested the OSI in a given period T, the following broadcast opportunity can potentially be cancelled (assuming it is not required for a further transmission of any OSI requested in an earlier period), and the resources reserved for these cancelled opportunities are saved (4 out of the 8 opportunities in the example of FIG. 1(b)).

It will be appreciated that, as shown in FIG. 1(b), irrespective of how many UEs have requested OSI broadcast during a given interval T, there need only be one broadcast of OSI, in a corresponding broadcast opportunity, that all UEs making an OSI request will be able to decode.

It will also be appreciated that, whilst FIG. 1(b) shows OSI transmissions in each of two consecutive broadcast opportunities, following a period T in which there are UE requests for OSI, the OSI transmission can occur once or multiple times (e.g. over multiple periods) following an on-demand request.

SUMMARY OF INVENTION

Technical Problem

However, whilst the use of on-demand broadcast of system information promises resource saving benefits, compared to normal periodic broadcasts triggered by the base station without UE involvement, the inventors have realised that in some scenarios the use of on-demand broadcast can result in a high additional signalling overhead without sufficient resource saving benefits to justify the additional signalling overhead.

The present invention seeks to provide a communication system and associated apparatus and methods for meeting or at least partially addressing the above issues.

In more detail, the utilisation, U, of OSI transmission opportunities, using on-demand broadcast (with a periodicity T), is given by the following equation:

[Math. 1]

$$U = 1 - e^{-\lambda KT} \qquad (1)$$

where $\lambda$ is the so-called 'arrival' rate of UEs (in units of UEs per second) that request on-demand broadcast of OSI with a periodicity T, and where K is the number of transmissions of OSI for a given OSI request (i.e. K=1 for a one-shot transmission of OSI).

The saving, S, of transmission opportunities of OSI, using on-demand broadcast (with a periodicity T) represents the un-utilised opportunities and is therefore given by the equation:

[Math. 2]

$$S = e^{-\lambda KT} \qquad (2)$$

Thus, U increases with increased periodicity T and/or increased $\lambda$. That is, the saving in transmission opportunities for OSI using on-demand broadcast, compared with the case of periodic broadcast (upper bound), is reduced with increased periodicity T and/or increased $\lambda$. For example, for T=80 ms and $\lambda$=5 UEs/s, the saving is S=0.68 (i.e. 68%). This saving is then reduced to 0.45 (45%), 0.2 (20%) and 0.05 (5%) for T=160 ms, 320 ms, and 640 ms, respectively.

It follows from equation (2) above, therefore, that when the network selects a large value of periodicity T, for on-demand broadcast, there may be no resource saving benefits (compared to normal periodic broadcasts triggered by the base station without UE involvement) when there is a small arrival rate of UEs requesting on-demand broadcast (small $\lambda$). Similarly, when the network selects a small value for periodicity T, for on-demand broadcast, there may be no resource saving benefits (compared to normal periodic broadcasts triggered by the base station without UE involvement) when there is a high arrival rate of UEs requesting on-demand broadcast (high $\lambda$).

High numbers of UEs requesting on-demand broadcast (i.e. high $\lambda$) can increase uplink signalling overhead (for example on a random access channel (RACH) and reserved random access (RA) preambles). Large values of broadcast periodicity T can delay the delivery of OSI to UEs. This delay may not be suitable to meet the latency requirements of certain UEs (e.g. UEs with delay sensitive services/applications/use cases).

Thus, the use of on-demand broadcast can result in a high additional signalling overhead without sufficient resource saving benefits to justify the additional signalling overhead.

Solution to Problem

In one aspect of the invention there is provided a communication apparatus for a telecommunication system, the communication apparatus comprising: a controller and a transceiver; wherein the controller is configured to: control transmission of system information, by the transceiver, in at least one cell operated by the communication apparatus, using: a periodic transmission mode in which at least part of said system information is transmitted at a regular periodic interval; and an on-demand transmission mode in which at least part of said system information is transmitted, following a request for system information from at least one communication device in said cell; determine a utilisation level representing an extent to which said on-demand transmission mode is being, or will be, utilised by the at least one communication device; and switch, based on said determined utilisation level, between using said on-demand transmission mode, and not using said on-demand transmission mode, for transmitting at least a given part of said system information.

In another aspect of the invention a communication device for a telecommunication system, the communication device comprising: a controller and a transceiver; wherein the controller is configured to: control reception, by the transceiver, of system information transmitted in a cell by communication apparatus, wherein said system information is transmitted using at least one of: a periodic transmission mode in which at least part of said system information is transmitted at a regular periodic interval; and an on-demand transmission mode in which at least part of said system information is transmitted, following a request for system information from at least one communication device in said cell; identifying what system information is required for which use of said on-demand transmission mode is switched on; and control transmission, by the transceiver, of a request for the identified system information; wherein the controller is configured to control the timing said request based on what system information has been identified as being required.

In another aspect of the invention there is provided communication apparatus for a telecommunication system, the communication apparatus comprising: a controller and a transceiver; wherein the controller is configured to: control transmission of system information, by the transceiver, in at least one cell operated by the communication apparatus, using: a periodic transmission mode in which at least part of said system information is transmitted at a regular periodic interval; and an on-demand transmission mode in which at least part of said system information is transmitted, following a request for system information from at least one communication device in said cell; wherein, when using the on-demand transmission mode, the controller is operable to control the timing of transmissions of requested system information to coincide with transmission opportunities configured to occur at a regular periodic interval; wherein the requested system information is transmitted in at least one of said periodic transmission opportunities following at least one request for that system information; and wherein, the controller is configured to configure at least one periodicity, for the periodic intervals between said transmission opportunities, to target a required utilisation level.

In another aspect of the invention there is provided a method performed by a communication apparatus for a telecommunication system the method comprising: controlling transmission of system information in at least one cell operated by the communication apparatus, using: a periodic transmission mode in which at least part of said system information is transmitted at a regular periodic interval; and an on-demand transmission mode in which at least part of said system information is transmitted, following a request for system information from at least one communication device in said cell; determining a utilisation level representing an extent to which said on-demand transmission is being, or will be, utilised by the at least one communication device; and switching, based on said determined utilisation level, between using said on-demand transmission mode, and not using said on-demand transmission mode, for transmitting at least a given part of said system information.

In another aspect of the invention there is provided a method performed by a communication device in a telecommunication system, the method comprising: receiving system information transmitted in a cell, by a communication apparatus, wherein said system information is transmitted using at least one of: a periodic transmission mode in which at least part of said system information is transmitted at a regular periodic interval; and an on-demand transmission mode in which at least part of said system information is transmitted, following a request for system information from at least one communication device in said cell; identifying what system information is required for which use of said on-demand transmission mode is switched on; and transmitting a request for the identified system information, wherein said request is timed based on what system information has been identified as being required.

In another aspect of the invention there is provided a method performed by a communication apparatus for a telecommunication system, the communication apparatus comprising: a controller and a transceiver; wherein the controller is configured to: control transmission of system information, by the transceiver, in at least one cell operated by the communication apparatus, using: a periodic transmission mode in which at least part of said system information is transmitted at a regular periodic interval; and an on-demand transmission mode in which at least part of said system information is transmitted, following a request for system information from at least one communication device in said cell; wherein, when using the on-demand transmission mode, the controller is configured to control the timing of transmissions of requested system information to coincide with transmission opportunities configured to occur at a regular periodic interval; wherein the requested system information is transmitted in at least one of said periodic transmission opportunities following at least one request for that system information; and wherein, the controller is configured to configure at least one periodicity, for the periodic intervals between said transmission opportunities, to target a required utilisation level.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) with any other disclosed and/or illustrated features. In particular but without limitation the features of any of the claims dependent from a particular independent claim may be introduced into that independent claim in any combination or individually.

Whilst specific hardware apparatus having a specific physical structure (e.g. controllers and transceiver circuitry) have been disclosed for performing the various procedures described herein, each step of the methods disclosed in the description and/or forming part of the claims, may be implemented by any suitable means for performing that step. In accordance with this each method aspect of the invention has a corresponding apparatus aspect comprising respective means for performing each step of that method aspect.

Example embodiments of the invention will now be described by way of example only with reference to the attached figures in which:

BRIEF DESCRIPTION OF DRAWINGS

FIG. 1 includes (a) and (b) which are timing diagrams illustrating a comparison between periodic transmission and on-demand transmission of system information;

FIG. 2 schematically illustrates a cellular telecommunication system of a type to which the invention is applicable;

FIG. 3 is a simplified sequence diagram illustrating how system information may be transmitted in the cellular telecommunication system of FIG. 1;

FIG. 4 is a simplified block diagram of physical apparatus for implementing user equipment suitable for use in the cellular telecommunication system of FIG. 1;

FIG. 5 is a simplified block diagram of physical apparatus for implementing a base station suitable for in the cellular telecommunication system of FIG. 1;

FIG. 6 is a simplified flow chart illustrating part of a method for managing the transmission of system information in the cellular telecommunication system of FIG. 1;

FIG. 7 is a simplified flow chart illustrating part of another method for managing the transmission of system information in the cellular telecommunication system of FIG. 1;

FIG. 8 is a simplified flow chart illustrating part of another method for managing the transmission of system information in the cellular telecommunication system of FIG. 1;

FIG. 9 is a simplified flow chart illustrating part of another method for managing the transmission of system information in the cellular telecommunication system of FIG. 1;

FIG. 10 shows a simplified 'state machine' instance for on-demand other system information transmission;

FIG. 11 FIGS. 11(a) and (b) are simplified sequence diagrams illustrating methods for indicating a type of transmission to be used for OSI in the cellular telecommunication system of FIG. 1;

FIG. 12 is a simplified sequence diagram illustrating another method for indicating a type of transmission to be used for OSI in the cellular telecommunication system of FIG. 1;

FIG. 13 is a simplified set of timing diagrams illustrating a method by which user equipment may request OSI in the cellular telecommunication system of FIG. 1;

FIG. 14 is a simplified sequence diagram illustrating a method for configuring a periodicity for on-demand OSI broadcast opportunities in the cellular telecommunication system of FIG. 1;

FIG. 15 is a simplified timing diagram illustrating a method for optimising the periodicity configured for on-demand OSI broadcast opportunities in the cellular telecommunication system of FIG. 1; and FIG. 16 is a simplified sequence diagram illustrating a method for determining an interval between on-demand OSI broadcast requests in the cellular telecommunication system of FIG. 1.

DESCRIPTION OF EMBODIMENTS

Overview

FIG. 2 schematically illustrates a cellular telecommunications system 1 in which a number of items of user equipment (UEs) 3 such as mobile telephones, and other fixed or mobile communication devices (e.g. IoT devices) can communicate with each other via a base station 5 and a core network 7 using an appropriate radio access technology (RAT). As those skilled in the art will appreciate, whilst two mobile devices 3, one IoT device 3, and one base station 5 are shown in FIG. 2 for illustration purposes, the system, when implemented, will typically include other base stations and UEs.

The base station 5 operates one or more associated cell 9 via which the UEs 3 can connect to the cellular telecommunications system 1. The UEs 3 may connect in the cell 9 by establishing a radio resource control (RRC) connection with the base station 5 operating that cell 9. As can be seen, base station 5 transmits system information 20 in the cell. The system information 20 comprises minimum system information 20-1 which, in this example, includes a subset of the information blocks (e.g. the MIB, SIB1, SIB2) carrying a 'minimum' set of information elements (e.g. those elements required to support cell selection, acquiring OSI, or accessing the cell). The system information 20 also comprises other system information (OSI) 20-2 that comprises all the system information in the other SIBs typically available in a cellular communication system.

The base stations 5 are connected to the core network 7 for example via an S1 interface and to any other base stations (not shown) for example via an X2 interface (either directly, or via for example an X2 gateway). The core network 7 typically includes logical nodes (or 'functions') for supporting communication in the telecommunication system 1. Typically, for example, the core network 7 of a 5G/NR system will include, amongst other functions, control plane functions, user plane functions and other functions for providing the functionality of a mobility management entity (MME), a serving gateway (S-GW), a packet data network gateway (P-GW) etc.

FIG. 3 is a simplified sequence diagram illustrating how the system information 20 may be transmitted in the cellular telecommunication system of FIG. 1. As seen in FIG. 3, the minimum system information 20-1 is transmitted on a regular periodic basis whereas the OSI 20-2 may be broadcast in a periodic manner, may be broadcast on-demand and/or may be unicast on-demand.

Beneficially, as described in more detail below, the base station 5 of the cellular telecommunication system 1 manages the transmission of OSI 20-2 to optimise the trade-off between the additional signalling overhead associated with on-demand transmission of OSI 20-2 and the resource usage inefficiencies associated with the sometimes unnecessary transmission of OSI 20-2 on a periodic basis. Specifically, the base station 5 of the cellular telecommunication system 1 manages switching from on-demand transmission of the OSI 20-2 to periodic transmission of OSI 20-2, and vice versa, based on one or more utilisation thresholds. Specifically, the base station 5 manages the switching of on-demand OSI 20-2 between an ON state and an OFF state based on comparisons of the utilisation (or potential utilisation) levels of periodic transmission opportunities associated with on-demand OSI transmission (relative to periodic transmission) with the utilisation threshold(s).

Beneficially, as described in more detail below, the base station 5 is able to inform the UE(s) 3 of transitions between the ON state and the OFF state (i.e. between on-demand and periodic transmission of OSI 20-2) promptly and efficiently using any of a number of different mechanisms.

During on-demand OSI 20-2 provision, each UE 3 is beneficially able to request a specific required OSI SIB (or SI message) or required group of OSI SIBs (or SI messages), and a number of efficient mechanisms are described by which the UE 3 can make such requests. In one particularly beneficial method described herein, for example, the UE 3 is able to use the timing of its request to efficiently request a particular SIB/SI message or group of such SIBs/SI messages.

The base station 5 employs a particularly beneficial method for determining an optimised periodicity for the periodic OSI transmission opportunities based on a target utilisation level threshold and/or latency constraints imposed by UE requirements. In a particularly advantageous variation of this the base station 5 is able to set different periodicities for different UEs based on latency requirements such that on-demand OSI for relaxed latency requirement UEs is transmitted with relatively long periods between transmission opportunities and on-demand OSI for tight latency requirement UEs is transmitted with relatively short periods between transmission opportunities.

Beneficially, the cellular telecommunication system 1 also configures a minimum interval that a UE 3 should wait between requests for on-demand OSI 20-2.

It will be appreciated that whilst a number of beneficial features are described above, an improved cellular communication system can still be realised even if only a subset (or one) of the beneficial features is employed.

User Equipment

FIG. 4 is a block diagram illustrating the main components of user equipment (such as a mobile telephone) 3 shown in FIG. 1. As shown, the UE 3 has a transceiver circuit 31 that is operable to transmit signals to and to receive signals from a base station (e.g. a gNB) 5 via one or more antennae 33. Although not necessarily shown in FIG. 4, the UE 3 may of course have all the usual functionality of a conventional UE 3 (such as a user interface 35) and this may be provided by any one or any combination of hardware, software and firmware, as appropriate. The UE 3 has a controller 37 to control the operation of the user equipment 3.

The controller 37 is associated with a memory 39 and is coupled to the transceiver circuit 31. Software may be pre-installed in the memory 39 and/or may be downloaded via the telecommunications network or from a removable data storage device (RMD), for example.

The controller 37 is configured to control overall operation of the UE 3 by, in this example, program instructions or software instructions stored within the memory 39. As shown, these software instructions include, among other things, an operating system 41, a communications control module 43 and a system information management module 45.

The communications control module 43 is operable to control the communication between the UE 3 and the base station 5. The communications control module 43 also controls the separate flows of uplink data and control data (such as OSI requests) that are transmitted to the base station 5 and the reception of downlink data and control data (such as the system information 20) transmitted by the base station 5. The communications control module 43 is responsible, for example, for managing the UE's part in idle and connected mode procedures such as cell (re)selection, camping on cells, random access channel (RACH) procedures, etc.

The system information management module 45 is responsible for managing the listening for, receipt, storage and interpretation of the system information 20 (minimum system information 20-1 and/or OSI 20-2), for generating requests for on-demand system OSI and for triggering the communications control module 43 to transmit such requests. The system information management module 45 is also responsible for controlling the timing of OSI request (e.g. the interval between them and/or to control what OSI is received as a result of the request where applicable).

Base Station (gNB)

FIG. 5 is a block diagram illustrating the main components of a base station 5 of the type shown in FIG. 1. As shown, the base station 5 includes transceiver circuitry 51 which is operable to transmit signals to and to receive signals from UEs 3 via one or more antennae 53 and which is operable to transmit signals to and to receive signals from the functions of the core network 7 via a core network interface 55 and/or other base stations via a base station interface 56. The core network interface 55 typically comprises an S1 (or S1-like) interface for communicating with the core network 7 and an X2 (or X2-like) interface for communicating with other base stations. A controller 57 controls the operation of the transceiver circuitry 51 in accordance with software stored in a memory 59. The software includes, among other things, an operating system 61, a communications control module 63 and a system information management module 65. Software may be pre-installed in the memory 59 and/or may be downloaded via the telecommunications network or from a removable data storage device (RMD), for example.

The communications control module 63 is operable to control the communication between the base station 5 and the UEs 3 and other network entities that are connected to the base station 5. The communications control module 63 also controls the separate flows of uplink and downlink user traffic and control data (e.g. system information 20) to be received by and transmitted to the UEs 3 served by base station 5 including, for example, control data for managing operation of the UEs 3. The communications control module 63 is responsible, for example, for controlling procedures such as the communication of measurement control/configuration information, system information, the base station's part in random access channel (RACH) procedures, etc.

The system information management module 65 is responsible for managing the generation of system information (SI) messages carrying appropriate system information 20 (minimum system information 20-1 and/or OSI 20-2), for receiving and responding to requests for on-demand system OSI 20-2 and for triggering the communications control module 63 to transmit SI messages. The system information management module 65 is also responsible for determining appropriate periodicities for periodic transmissions of minimum system information 20-1 and OSI 20-2 and for on-demand transmission opportunities.

Managing a Transition from On-Demand OSI Transmission to Periodic OSI Transmission FIG. 6 is a simplified flow chart illustrating part of a method for managing the transmission of system information 20, which may be performed by the base station 5 of FIG. 1, in which on-demand OSI 20-2 transmission is initially in the ON state before being switched to the OFF state. FIG. 6 illustrates, in particular, a beneficial method in which the base station switches from on-demand OSI 20-2 transmission to periodic OSI 20-2 transmission based on a threshold, $TH_{OFF}$.

As seen in FIG. 6 at S610, minimum system information 20-1 is broadcast periodically in accordance with legacy procedures—this occurs throughout the illustrated process.

On-demand OSI 20-2 transmission (broadcast in this example) is initially in the ON state and so OSI 20-2 transmissions occur on-demand, at the request of UEs in the cell 9 of the base station 5, at S612. These OSI 20-2 transmissions occur during periodic broadcast opportunities that occur at a periodicity, T, configured appropriately in the base station 5. The base station 5 measures the utilisation level, U, of the periodic broadcast opportunities at S614 and compares it to a utilisation threshold, $TH_{OFF}$, that is configured at the base station 5 for turning on-demand OSI 20-2 transmission OFF at S616 ($TH_{OFF}$ is effectively a threshold for transitioning from on-demand to periodic OSI 20-2 provision). If, at S616, the measured utilisation level, U, is found to be greater than or equal to the utilisation threshold, $TH_{OFF}$, then on-demand OSI 20-2 transmission is switched OFF by the base station 5, at S618, and the base station 5 switches to using the periodic broadcast approach for the provision of OSI 20-2 at S620. Conversely, at S616, if the measured utilisation level, U, is found to be less than the utilisation threshold, $TH_{OFF}$, then on-demand OSI 20-2 transmission is kept ON by the base station 5 and the base station 5 continues to use the on-demand broadcast approach for the provision of OSI 20-2 at S612.

The base station 5 will inform the UE(s) of the change in OSI 20-2 transmission type (e.g. as explained later) and the UEs can thus cease to send unnecessary requests for OSI 20-2. The use of an appropriately configured value of $TH_{OFF}$ for switching off on-demand OSI 20-2 can therefore reduce unnecessary signalling when periodic broadcast opportunity utilisation levels are high and resource saving benefits are therefore relatively low.

Managing a Transition from Periodic OSI Transmission to On-Demand OSI Transmission FIG. 7 is a simplified flow chart illustrating part of a method for managing the transmission of system information 20, which may be performed by the base station 5 of FIG. 1, in which on-demand OSI 20-2 transmission is initially in the OFF state before being switched to the ON state. FIG. 7 illustrates, in particular, a beneficial method in which the base station switches from periodic OSI 20-2 transmission based on a threshold, $TH_{ON}$.

As seen in FIG. 7 at S710, minimum system information 20-1 is broadcast periodically in accordance with legacy procedures—this occurs throughout the illustrated process.

On-demand OSI 20-2 transmission (broadcast in this example) is initially in the OFF state and so OSI 20-2 transmissions occur periodically at a periodicity configured appropriately in the base station 5, rather than at the request of UEs in the cell 9 of the base station 5, at S711. The base station 5 estimates the arrival rate, $$\hat{\lambda},$$ [Math. 3]

of UEs requesting on-demand broadcast of OSI 20-2 at S712. This estimation may be carried out in a number of ways but, in the present example, is based on the result of a measurement of connection requests for certain service(s) over a period of time.

The base station 5 configures, at S714, a value of periodicity, T (for on-demand OSI 20-2) with a maximum value that is less than or equal to a required latency on the delivery of on-demand OSI 20-2 for a given service/application/use case. The estimated value of arrival rate, $$\hat{\lambda},$$ [Math. 4]

and the configured value of periodicity, T are used, at S716, to calculate an estimated utilisation, $\hat{U},$ [Math. 5]

of periodic transmission opportunities were the OSI 20-2 to be transmitted on-demand $$(\hat{U}=1-e^{-\hat{\lambda}KT})$$ [Math. 6]

where K is the number of transmissions of OSI 20-2 for a given OSI request (i.e. K=1 for a one-shot transmission of OSI 20-2). At S718 the estimated utilisation level, $$\hat{U},$$ [Math. 7]

of the periodic broadcast opportunities is compared to a utilisation threshold, $TH_{ON}$, that is configured at the base station 5 for turning on-demand OSI 20-2 transmission ON ($TH_{ON}$ is effectively a threshold for transitioning from periodic OSI 20-2 provision to on-demand OSI 20-2 provision). If, at S718, the estimated utilisation level, $$\hat{U},$$ [Math. 8]

is found to be less than the utilisation threshold, $TH_{ON}$, then on-demand OSI 20-2 transmission is switched ON by the base station 5, at S720, and the base station 5 switches to using the on-demand broadcast approach for the provision of OSI 20-2 at S722. Conversely, at S718, if the estimated utilisation level, $$\hat{U},$$ [Math. 9]

is found to be greater than or equal to the utilisation threshold, $TH_{ON}$, then on-demand OSI 20-2 transmission is kept OFF by the base station 5 and the base station 5 continues to use the periodic broadcast approach for the provision of OSI 20-2 at S711.

The base station 5 will inform the UE(s) of the change in OSI 20-2 transmission type (e.g. as explained later) and the UEs can thus begin to send requests for OSI 20-2. The use of an appropriately configured value of $TH_{ON}$ for switching on on-demand OSI 20-2 can therefore ensure that the resource saving benefits available, when periodic broadcast opportunity utilisation levels are relatively low, are achieved when the additional signalling required for making the OSI requests justifies it.

FIG. 8 is a simplified flow chart illustrating part of another method for managing the transmission of system information 20, which may be performed by the base station 5 of FIG. 1, in which on-demand OSI 20-2 transmission is initially in the OFF state before being switched to the ON state. FIG. 8 illustrates, in particular, another beneficial method in which the base station switches from periodic OSI 20-2 transmission based on a threshold, $TH_{ON}$.

As seen in FIG. 8 at S810, minimum system information 20-1 is broadcast periodically in accordance with legacy procedures—this occurs throughout the illustrated process.

On-demand OSI 20-2 transmission (broadcast in this example) is initially in the OFF state and so OSI 20-2 transmissions occur periodically at a periodicity configured appropriately in the base station 5, rather than at the request of UEs in the cell 9 of the base station 5, at S811.

When, S812, a predetermined number, N, of requests for on-demand transmission of OSI are received from UE(s) in a given period of time the base station 5 switches on-demand OSI 20-2 transmission ON by the base station 5, at S814. The base station 5 then measures the utilisation level, U, of the periodic broadcast opportunities at S816 and compares it to a utilisation threshold, $TH_{ON}$, that is configured at the base station 5 for turning on-demand OSI 20-2 transmission ON at S818. If, at S818, the measured utilisation level, U, is found to be less than the utilisation threshold, $TH_{ON}$, then on-demand OSI 20-2 transmission is maintained in its ON state by the base station 5, and the base station 5 uses the on-demand OSI 20-2 broadcast approach for the provision of OSI 20-2 at S820. Conversely, at S818, if the measured utilisation level, U, is found to be greater than or equal to the utilisation threshold, $TH_{ON}$, then on-demand OSI 20-2 transmission is switched OFF by the base station 5, at S822, and the base station 5 proceeds to use the periodic broadcast approach for the provision of OSI 20-2 at S811.

The base station 5 will inform the UE(s) of the change in OSI 20-2 transmission type (e.g. as explained later) and the UEs can thus begin to send requests for OSI 20-2. The use of an appropriately configured value of $TH_{ON}$ for switching on on-demand OSI 20-2 can therefore ensure that the resource saving benefits available, when periodic broadcast opportunity utilisation levels are relatively low, are achieved when the additional signalling required for making the OSI requests justifies it.

FIG. 9 is a simplified flow chart illustrating part of another method for managing the transmission of system information 20, which may be performed by the base station 5 of FIG. 1, in which on-demand OSI 20-2 transmission is initially in the OFF state before being switched to the ON state. FIG. 9 illustrates, in particular, another beneficial method in which the base station switches from periodic OSI 20-2 transmission based on a threshold, $TH_{ON}$. The method of FIG. 9 is, in effect, a combination of the methods of FIG. 7 and FIG. 8.

As seen in FIG. 9 at S910, minimum system information 20-1 is broadcast periodically in accordance with legacy procedures—this occurs throughout the illustrated process.

On-demand OSI 20-2 transmission (broadcast in this example) is initially in the OFF state and so OSI 20-2 transmissions occur periodically at a periodicity configured appropriately in the base station 5, rather than at the request of UEs in the cell 9 of the base station 5, at S911. The base station 5 estimates the arrival rate, $$\hat{\lambda},$$ [Math. 10]

of UEs requesting on-demand broadcast of OSI 20-2 at S912. This estimation may be carried out in a number of ways but, in the present example, is based on the result of a measurement of connection requests for certain service(s) over a period of time.

The base station 5 configures, at S914, a value of periodicity, T (for on-demand OSI 20-2) with a maximum value that is less than or equal to a required latency on the delivery of on-demand OSI 20-2 for a given service/application/use case. The estimated value of arrival rate, $$\hat{\lambda},$$ [Math. 11]

and the configured value of periodicity, T are used, at S916, to calculate an estimated utilisation, $$\hat{U},$$ [Math. 12]

of periodic transmission opportunities were the OSI 20-2 to be transmitted on-demand $$(U=1-e^{-\hat{\lambda}KT})$$ [Math. 13]

where K is the number of transmissions of OSI 20-2 for a given OSI request (i.e. K=1 for a one-shot transmission of OSI 20-2). At S918 the estimated utilisation level, $$\hat{U},$$ [Math. 14]

of the periodic broadcast opportunities is compared to a utilisation threshold, $TH_{ON}$, that is configured at the base station 5 for turning on-demand OSI 20-2 transmission ON. If, at S918, the estimated utilisation level, $$\hat{U},$$ [Math. 15]

is found to be less than the utilisation threshold, $TH_{ON}$, then on-demand OSI 20-2 transmission is switched ON by the base station 5, at S920. Conversely, at S918, if the estimated utilisation level, $$\hat{U},$$ [Math. 16]

is found to be greater than or equal to the utilisation threshold, $TH_{ON}$, then on-demand OSI 20-2 transmission is kept OFF by the base station 5 and the base station 5 continues to use the periodic broadcast approach for the provision of OSI 20-2 at S911.

The base station 5 then measures the utilisation level, U, of the periodic broadcast opportunities at S922 and compares it to the utilisation threshold, $TH_{ON}$, at S924. If, at S924, the measured utilisation level, U, is found to be less than the utilisation threshold, $TH_{ON}$, then on-demand OSI 20-2 transmission is maintained in its ON state by the base station 5, and the base station 5 uses the on-demand OSI 20-2 broadcast approach for the provision of OSI 20-2 at S926. Conversely, at S924, if the measured utilisation level, U, is found to be greater than or equal to the utilisation threshold, $TH_{ON}$, then on-demand OSI 20-2 transmission is switched OFF by the base station 5, at S928, and the base station 5 proceeds to use the periodic broadcast approach for the provision of OSI 20-2 at S911.

As explained previously, the base station 5 will inform the UE(s) of the change in OSI 20-2 transmission type (e.g. as explained later) and the UEs can thus begin to send requests for OSI 20-2. The use of an appropriately configured value of $TH_{ON}$ for switching on on-demand OSI 20-2 can therefore ensure that the resource saving benefits available, when periodic broadcast opportunity utilisation levels are relatively low, are achieved when the additional signalling required for making the OSI requests justifies it.

Managing Transitions Between Periodic OSI Transmission and On-Demand OSI Transmission (Summary)

The methods described with reference to FIGS. 6 to 9 are summarised in FIG. 10 which shows a simplified 'state machine' instance for on-demand OSI 20-2 provision per OSI SIB/SI.

As seen in FIG. 10, in order to switch OFF on-demand provision of OSI 20-2, the base station 5 measures U and compares the value to $TH_{OFF}$, if U is larger than or equal to $TH_{OFF}$ then the on-demand broadcast is switched OFF (as illustrated in FIG. 6).

In order to switch ON on-demand provision of OSI 20-2, the base station 5 can either use a calculated value of utilisation, $$\hat{U}$$ [Math. 17]

(as described with reference to FIG. 7) or a measured value of utilisation, U, (as described with reference to FIG. 8) and compare it to $TH_{ON}$. The calculated/measured value is less than $TH_{ON}$ then on-demand broadcast is switched/maintained ON. A hybrid approach has also been described (with reference to FIG. 9) in which a calculated value of utilisation, $$\hat{U},$$ [Math. 18]

is used to transition to the ON state initially, and a measured value of utilisation, U, is used to determine whether the ON state should be maintained.

Whilst, in theory, $TH_{ON}$ may equal $TH_{OFF}$, it is assumed that, in general, $TH_{ON}$ and $TH_{OFF}$ will be different and selected to avoid/minimise undesirable repetitive transitioning back and forth between on-demand ON and OFF states.

It will be appreciated that in any of these methods, the base station 5/network may be configured to switch on-demand broadcast of OSI ON/OFF for: all OSI SIBs/SI messages; one or more groups of OSI SIBs/SIs; or a selected individual OSI SIB/SI.

Indicating Type of Transmission Used for OSI SIBs (Explicit)

There are a number of mechanisms by which a base station 5, such as the base station 5 of FIG. 1, can inform the UE 3 of the type of transmission used for OSI SIBs (e.g. that on-demand transmission (broadcast or unicast) is switched OFF/ON).

In one option, for example, the base station 5 may provide an explicit OSI 20-2 transmission type indication using a single bit flag or indicator, for all OSI SIBs, that are provided to the UE 3, to indicate whether all OSI SIBs are available on-demand, or by periodic transmission (or whether on-demand broadcast/unicast transmission is turned ON or OFF). For example: a single bit OSI flag/indicator having a value of 0 (or FALSE) may be used to indicate that all OSI SIBs are available on-demand (or on-demand broadcast/unicast transmission is turned ON). Similarly a single bit OSI flag/indicator having a value of 1 (or TRUE) may be used to indicate that all OSI SIBs are available by periodic transmission (or on-demand broadcast/unicast transmission is turned OFF). It will be appreciated that the actual values (0/FALSE and 1/TRUE) used may be reversed.

In another exemplary option, a single bit OSI flag/indicator may be provided on a per OSI SIB group and/or per OSI SIB basis to indicate, for each OSI SIB group and/or each OSI SIB whether that OSI SIB group/OSI SIB is available on-demand, or by periodic transmission (or whether on-demand broadcast/unicast transmission is turned ON or OFF for that specific OSI SIB group/SIB). For example: a single bit OSI flag/indicator, for a given OSI SIB group/OSI SIB, having a value of 0 (or FALSE) may be used to indicate that that OSI SIB group/OSI SIB is available on-demand (or for which on-demand broadcast/unicast transmission is turned ON). Similarly a single bit OSI flag/indicator, for a given OSI SIB group/OSI SIB, having a value of 1 (or TRUE) may be used to indicate that that OSI SIB group/OSI SIB is available by periodic transmission (or for which on-demand broadcast/unicast transmission is turned OFF). It will be appreciated that the actual values (0/FALSE and 1/TRUE) used may be reversed.

In another exemplary variation, a binary string of bits may be used to indicate a group of OSI SIBs which are available on-demand (or for which on-demand broadcast/unicast transmission is turned ON) and/or a binary string of bits are used to indicate a group of OSI SIBs which are available by periodic transmission (or for which on-demand broadcast/unicast transmission is turned OFF). It will be appreciated that, whilst this approach may appear more complex, it has the benefit that it can reduce the number of bits used to provide the indication significantly (e.g. 4 or 5 bits can provide up to 16 or 32 different indications respectively).

It will be appreciated that the above mechanisms are not mutually exclusive and may be employed in the same base station 5, for example to provide an explicit indication for all OSI SIBs where it is efficient to do so, and to provide per OSI SIB group and/or per OSI SIB where appropriate.

It will be appreciated that, in addition to informing the UE 3 of the type of transmission used for OSI SIBs in accordance with one or more of the above mechanisms, the network will typically inform the UE 3 of the configured periodicity for on-demand broadcast of different OSI SIBs.

FIG. 11 illustrates two mechanisms by which one or more explicit indications (as described above) may be provided to indicate a type of transmission to be used for OSI SIBs.

FIG. 11(a) is a sequence diagram which shows the provision, by a base station 5, of the explicit indication(s) for the OSI SIBs in a minimum system information SIB (e.g. in MIB, SIB1 or SIB2) that is broadcast to all UEs 3 in the cell 9 of the base station.

FIG. 11(b) is a sequence diagram which shows the dynamic scheduling, by a base station 5, of the explicit indication(s) using a common downlink control information (DCI) format. In this example, the explicit indication(s) may be signalled in a downlink control channel (e.g. a Physical Downlink Control Channel (PDCCH) or the like) in accordance with the DCI format.

It will be appreciated that the mechanisms shown in FIG. 11 are not mutually exclusive and one or both mechanisms may be provided in any particular base station.

Indicating Type of Transmission Used for OSI SIBs (Implicit)

As an alternative to, or in addition to, the explicit indication(s) described above, a base station 5, such as the base station 5 of FIG. 1, may be configured to inform the UE 3 of the type of transmission used for OSI SIBs implicitly.

In this example, the base station 5 (or other network entity) conditionally configures uplink resource(s) for a UE 3 to request OSI in an on-demand manner when the OSI SIB(s) are transmitted on-demand (on-demand transmission is ON for the SIB(s)) but not when the OSI SIB(s) are transmitted periodically (on-demand transmission is OFF for the SIB(s)). Accordingly, if the base station 5 does not signal the uplink resource reserved for the UE 3 to request one or more particular OSI SIB(s), then these OSI SIBs are periodically broadcasted. On the other hand, when the network signals an uplink resource reserved for the UE 3 to request for one or more OSI SIBs then these OSI SIBs are transmitted on-demand.

Thus, the UE 3 can determine, based on the receipt or absence of allocated uplink resources for requesting one or more OSI SIBs in an on-demand manner, whether those OSI SIBs are transmitted on-demand (on-demand transmission is ON for the SIB(s)) or periodically (on-demand transmission is OFF for the SIB(s)).

FIG. 12 is a sequence diagram illustrating a mechanism in which such an implicit indication is provided. As seen in FIG. 12 at S1210 the base station 5 identifies uplink resources to be allocated for use by the UE 3 when requesting any OSI SIB(s) that are to be provided on-demand. The base station 5 signals the resources to the UE at S1212 (assuming at least one such 'on-demand' OSI SIB is available). The UE 3 determines, at S1214, for any OSI SIB that is required, whether that OSI SIB is provided on-demand, or on a periodic basis. If the UE 3 determines that any OSI SIB that is required is provided on-demand then the UE 3 requests that OSI SIB accordingly at S1216. In response to the request the base station 5 provides, at S1218, (by broadcast or unicast as appropriate) the requested OSI SIB(s).

The UE 3 waits, as illustrated at S1220, for the periodic transmission of any OSI SIB is provided, by the base station 5, on a periodic basis (as shown at S1222). It will be appreciated that such periodic transmission can occur at any time and is not limited to happening in accordance with the sequence shown in FIG. 12.

Further details of how a UE 3 can request OSI SIBs and how the base station may allocate uplink resources for such a request are described in the following sections.

Requesting On-Demand Provision of Other System Information

There are a number of mechanisms by which UE 3, such as one or more of the mobile devices 3 of FIG. 1, can request on-demand provision (broadcast or unicast) of OSI SIBs.

In one option, for example, a UE 3 may send a single request (e.g. using a single assigned resource) for all on-demand system information 20.

In this example, as a first step, the network will typically assign/allocate one or more uplink (UL) resource(s) for requesting all OSI SIBs 'on-demand'.

For example, a subset of one or more specific random access channel (RACH) preambles may be configured, and signalled to the UE 3, by the base station 5 for use by the UE 3 to request, during an initial access (RACH) procedure, the provision of all OSI SIBs. The UE may, for example, add its request for on-demand system information 20 in message 3 and/or message 5 of the RACH procedure, during initial access, to request all SIBs (for other system information 20-2).

The base station 5 may, alternatively or additionally, signal grant free resources (e.g. specific physical resource blocks (PRBs)) to be used for making the request, in advance, in a minimum system information SIB.

The UE 3 may thus transmit its request message to the base station 5 using the appropriate uplink resources (e.g. using the configured preamble in message 1 of the RACH procedure or using the specific PRBs configured by the minimum system information 20-1).

On receipt of the request, the network can thus determine that all OSI SIBs are to be sent to the UE 3 based on the uplink resources used by the UE for the purposes of making the request for OSI.

In another option, for example, the on-demand OSI SIBs may be grouped in a number of groups each comprising a different respective subset of OSI SIBs. In this example the UE 3 may send a separate respective request (e.g. using an associated assigned resource) for each group of on-demand OSI SIBs.

For example, a respective subset of one or more specific random access channel (RACH) preambles may be configured, and signalled to the UE 3, by the base station 5 for use by the UE 3 to request, during an initial access (RACH) procedure, the provision each group of OSI SIBs. The UE may, for example, add its request for on-demand system information 20 in message 3 and/or message 5 of the RACH procedure, during initial access, to request all SIBs (for other system information 20-2).

The base station 5 may, alternatively or additionally, signal respective grant free resources (e.g. specific physical resource blocks (PRBs)) to be used for making a request for each group of other system SIBs, in advance, in a minimum system information SIB.

When the UE 3 requires a specific group of SIBs it may thus transmit its request message to the base station 5 using the appropriate uplink resources (e.g. using the configured preamble, corresponding to the desired group of OSI SIBs, in message 1 of the RACH procedure, or using the specific PRBs, corresponding to the desired group of OSI SIBs, configured by the minimum system information 20-1).

On receipt of the request, the network can then determine which group of OSI SIBs to send to the UE 3 based on the uplink resources used by the UE for the purposes of making the request for OSI.

In another option, for example, the UE 3 may send an individual respective request (e.g. using an associated assigned resource) for each on-demand OSI SIB.

For example, a respective subset of one or more specific random access channel (RACH) preambles may be configured, and signalled to the UE 3, by the base station 5 for use by the UE 3 to request, during an initial access (RACH) procedure, the provision each OSI SIB. The UE may, for example, add its request for on-demand system information 20 in message 3 and/or message 5 of the RACH procedure, during initial access, to request all system information blocks (for OSI 20-2).

The base station 5 may, alternatively or additionally, signal respective grant free resources (e.g. specific physical resource blocks (PRBs)) to be used for making a request for each other system SIB, in advance, in a minimum system information 20 SIB.

When the UE 3 requires a particular SIB it may thus transmit its request message to the base station 5 using the appropriate uplink resources (e.g. using the configured preamble, corresponding to the desired OSI SIB, in message 1 of the RACH procedure, or using the specific PRBs, corresponding to the desired OSI SIB, configured by the minimum system information 20).

On receipt of the request, the network can then determine which system information SIB to send to the UE 3 based on the uplink resources used by the UE for the purposes of making the request for OSI 20-2.

A particularly beneficial option for UE 3 to request on demand provision (broadcast or unicast) of OSI 20-2 is illustrated in FIG. 13.

In this example, rather than having the resources (preamble/frequency resources) used for a specific request determining which OSI SIBs should be sent, the timing used by the UE 3 to transmit a specific request is used to determine which SIBs are transmitted.

Specifically, where a number of system information SIBs are each transmitted at a different respective periodicity ($m^2 T_{min}$—where m is an integer greater than or equal to zero), and $T_{min}$ is the periodicity of the SIB with the shortest periodicity), the UE 3 is configured to time the sending of its request for OSI 20-2 such that it is guaranteed to receive the required SIB(s) at the next available opportunity for sending OSI 20-2. The UE 3 achieves this by sending the request in the period (e.g. of length $T_{min}$) immediately preceding the next opportunity for sending the required SIB having the longest paging opportunity (e.g. in the period $T_{min}$ immediately preceding the opportunity for transmitting the required SIB having the longest periodicity).

When the base station receives the UE's request for on-demand broadcast of OSI 20-2, the base station will transmit all OSI SIBs whose transmit opportunities occur at the end of the current period ($T=T_{min}$). Accordingly, the transmitted SIB(s) will naturally include the required SIB having the longest periodicity and any SIBs having a periodicity less than that of the required SIB having the longest periodicity. It will be appreciated that this transmission can be for one time or multiple times. In this manner, therefore, the UE 3 can select the timing of the request in order to receive all required SIBs.

In FIG. 13, for example, there are three OSI SIBs ($SIB_A$, $SIB_B$ and $SIB_C$) available (although it will be appreciated that there may be any suitable number). These SIBs each have a different respective periodicity associated with their transmission opportunities. $SIB_A$ has the shortest periodicity of $T_A=T_{min}$, $SIB_B$ has the next shortest periodicity of $T_B=2T_{min}$ and $SIB_C$ has the longest periodicity of $T_C=4T_{min}$.

As seen in the example of FIG. 13(a), when a UE 3 requires three available SIBs ($SIB_A$, $SIB_B$, $SIB_C$), the UE 3 waits until the period, $T_{min}$, immediately preceding the next transmission opportunity for the SIB ($SIB_C$) having the longest period between transmission opportunities before the UE 3 sends a request for OSI 20-2 (it can be seen that this transmission opportunity will occur the next time that t modulo $T_C=0$). The base station 5 then broadcasts all SIBs sharing that transmission opportunity (i.e. $SIB_A$, $SIB_B$ and $SIB_C$ in the illustrated example) at that transmission opportunity.

As seen in the example of FIG. 13(b), when a UE 3 requires only $SIB_C$, the UE 3 waits until the period, $T_{min}$, immediately preceding the next transmission opportunity for $SIB_C$ before the UE 3 sends a request for OSI 20-2 (it can be seen that this transmission opportunity will occur the next time that t modulo $T_C=0$). The base station 5 still broadcasts all SIBs sharing that transmission opportunity (i.e. $SIB_A$, $SIB_B$ and $SIB_C$ in the illustrated example) at that transmission opportunity.

As seen in the example of FIG. 13(c), when a UE 3 requires only the SIB having the shortest period between transmission opportunities ($SIB_A$), the UE 3 waits until the period, $T_{min}$, immediately preceding the next transmission opportunity for that SIB (the next time that t modulo $T_A=0$) before the UE 3 sends a request for OSI 20-2. It can be seen that the next time that t modulo $T_A=0$ occurs, in the illustrated example, is when t modulo $T_C=2T_{min}$. The base station 5 then broadcasts all SIBs sharing that transmission opportunity (i.e. $SIB_A$ and $SIB_B$) at that transmission opportunity.

Thus, as seen in the examples of FIGS. 13(a) and (b), when a UE 3 requires $SIB_C$, regardless of whether or not it also requires one of the other available OSI SIBs ($SIB_A$ and/or $SIB_B$), the UE 3 waits until the period, $T_{min}$, immediately preceding the next transmission opportunity for $SIB_C$ (when t modulo $T_C=0$) before the UE 3 sends a request for OSI 20-2. The base station then sends all SIBs sharing that transmission opportunity (i.e. $SIB_A$, $SIB_B$ and $SIB_C$ in the illustrated example).

By way of further illustrative example only, consider a scenario in which the three SIBs ($SIB_A$, $SIB_B$ and $SIB_C$) in FIG. 13 have periods between transmission opportunities of 80 ms ($T_{min}$), 160 ms ($2T_{min}$) and 320 ms ($4T_{min}$) respectively, are available for on-demand broadcast. If the UE 3 only requires the 80 ms SIB ($SIB_A$), then the base station 5 can broadcast this SIB to the UE 3 in its cell 9 at any 80 ms opportunity. Accordingly, the UE 3 can time its request to be sent in any of the 80 ms periods between OSI 20-2 transmission opportunities. However, if the UE 3 requires all three available OSI SIBs, then the UE 3 chooses to transmit the request for OSI 20-2 in the $T_{min}$ period immediately preceding the next opportunity for sending the 320 ms SIB ($SIB_C$)—i.e. somewhere between the time instance t=240 ms and the time instance t=320 ms (relative to the last 320 ms opportunity). Similarly, if the UE 3 requires only $SIB_A$ and $SIB_C$, then the UE 3 will still choose to transmit the request for OSI 20-2 in the $T_{min}$ period immediately preceding the next opportunity for sending the 320 ms SIB ($SIB_C$) albeit that this will result in the unnecessary transmission of $SIB_B$.

Whilst this approach means that sometime SIBs that are not required will be transmitted unnecessarily, is has the benefit of simplifying resource management for uplink requests significantly (by virtue of only requiring only one type of request). It can be seen that, in this example, the assumption is that the latency requirement for a given UE 3 is determined by the SIB that it needs with the longest period. For example, in the exemplary scenario described above in which the UE 3 requires both $SIB_A$ and $SIB_C$ the UE 3 will need to wait for 320 ms to receive both SIBs.

Optimisation of On-Demand Periodicity

FIG. 14 is a simplified sequence diagram illustrating a beneficial method for optimising the periodicity configured for on-demand OSI broadcast opportunities.

Specifically, in this example, the base station 5 determines an optimum value of periodicity, $T=T_{OP}$, for on-demand broadcast of OSI, based on the UE(s) request (arrival) rate of on-demand broadcast (i.e. λ) and a utilisation threshold for OSI transmission opportunities, $TH_U$, that is configured by the base station 5 to have a value of between zero and one.

If the target utilisation, U, is constrained to be less than (or equal to) $TH_U$, then it follows, since $U=1-e^{-\lambda KT}$ and $U<TH_U$, that $e^{-\lambda KT}>1-TH_U$. Accordingly, setting $T=T_{Op}$, it is evident that the optimum value of periodicity, $T_{OP}$, must be set in accordance with the following inequality:

$$T_{OP} < \left[\frac{-\log(1-TH_U)}{\lambda K}\right] \quad \text{[Math. 19]}$$

Where K is the number of transmissions of OSI 20-2 for a given OSI request (i.e. K=1 for a one-shot transmission of OSI 20-2).

The base station 5 configures the value of periodicity, $T_{Op}$, with a maximum value that is less than or equal to the required latency on the delivery of OSI (on-demand) for a given service/application/use case (e.g. machine type communication (MTC), mobile broadband (MBB), Ultra-Reliable Low latency Communications (URLLC), and/or the like).

The configured periodicity can be informed to the UE 3 in any suitable manner. In this example the configured periodicity is sent in minimum system information although it may be informed using dedicated (e.g. RRC) signalling or the like.

It will be appreciated that the base station 5 may configure the optimum periodicity for all OSI SIBs/SI messages, on a per SIB/SI message group basis, and/or on a per SIB/SI message basis.

It will further be appreciated that the base station 5 may configure different optimum periodicities for different UEs 3 or groups of UEs 3. By way of example, FIG. 15 is a simplified diagram illustrating an example of how the base station 5 may configure different values of periodicities for different UEs 3 based on their latency requirements.

In FIG. 15, a long periodicity, $T_L$, is configured for on-demand broadcast to UEs (referred to as $UE_L$) with relaxed latency requirements on receiving the OSI 20-2. A short periodicity, $T_S$, is configured for on-demand broadcast to UEs (referred to as $UE_H$) with much tighter latency requirements on receiving the OSI 20-2.

Optimisation of UE Request Interval for On-Demand OSI Broadcast

FIG. 16 is a simplified sequence diagram illustrating a beneficial method for determining an interval between on-demand OSI broadcast requests.

Specifically, in this example, the base station 5 sets the value of periodicity (referred to as $T_B$ in this example) for on-demand broadcast (e.g. which may be using the method described with reference to FIG. 14 where $T_{OP}$ of FIG. 14 is equivalent to $T_B$ in this example). In this example, the minimum value of $T_B$ will be the minimum possible SI periodicity (e.g. $T_B$=80 ms in current LTE systems where LTE SI periodicity can be 80, 160, 320, 640, 1280, 2560 and 5120 ms). $T_B$ may be configured at the current periodicity for periodic (or on-demand broadcast opportunities) system information provision in the system.

A value of a so-called 'wait' period, $T_W$, representing the time a UE 3 has to wait (listening for OSI broadcasts) between requests for on-demand broadcasts is also configured for each UE 3. In this example, $T_W$ is set as $T_W = N_{decode} \cdot T_B$ where $N_{decode}$ is the number of times UE 3 will attempt decoding of system information broadcasts at consecutive on-demand broadcast opportunities. For example, the maximum value of T w=5120 ms, for $T_B$=80 ms and $N_{decode}$=64 (i.e. $N_{decode}$=5120 ms/80 ms).

The UE 3 can start with one value of $N_{decode}$ (e.g. a maximum value) and reduce it incrementally (thereby reducing the value of $T_W$).

The UE 3 checks if the on-demand broadcast feature is enabled by the network (e.g. based on minimum system information, or other signalling, received from the base station 5). The UE 3 reads the value of $T_B$ configured by the base station 5 and determines and appropriate value of $N_{decode}$ and hence $T_W$ to decide how long the UE 3 has to listen before placing a new request for on-demand broadcast of one or more SIB(s)/SI message(s).

It can be seen that the use of the wait period, $T_W$, has the potential to beneficially reduce the number of UE requests and thereby reduce UE power consumption. Moreover, it has the potential to reduce the amount of uplink resources that have to be reserved (for requests) and uplink congestion.

Modifications and Alternatives

A number of detailed embodiments have been described above. As those skilled in the art will appreciate, a number of modifications and alternatives can be made to the above example embodiments whilst still benefiting from the inventions embodied therein. By way of illustration only a number of these alternatives and modifications will now be described.

In the above example embodiments, a number of software modules were described for implementing the user equipment 3 and base station 5. As those skilled will appreciate, such software modules may be provided in compiled or un-compiled form and may be supplied to the corresponding hardware as a signal over a computer network, or on a recording medium. Further, the functionality performed by part or all of this software may be performed using one or more dedicated hardware circuits. However, the use of software modules is preferred as it facilitates the updating of the corresponding hardware in order to update its functionality. Similarly, although the above example embodiments employed transceiver circuitry, at least some of the functionality of the transceiver circuitry can be performed by software.

The functionality of the user equipment 3 and base station 5 will typically be implemented using one or computer processing apparatus having one or more hardware computer processors programmed using appropriate software instructions to provide the required functionality. It will be appreciated that all or part of this functionality may be implemented in hardware as dedicated circuitry for example using one or more dedicated integrated circuits such as an application specific integrated circuit (ASIC) or the like.

It will be appreciated that the controllers referred to in the description of the UE 3, and base station 5 may comprise any suitable controller such as, for example an analogue or digital controller. Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

Whilst the base station 5 has been described in terms of a gNB it may be any suitable base station including a base station in which the functionality of a gNB may be split between one or more distributed units (DUs) and a central unit (CU) with a CU typically performing higher level functions and communication with the next generation core and with the DU performing lower level functions and communication over an air interface with user equipment (UE) in the vicinity (i.e. in a cell operated by the gNB).

The base station 5 is described above as performing a number of functions related to the provision of system information including, for example, the configuration of periodicities, the triggering of transitions between on-demand and periodic OSI provision, informing the base station of system information related data (e.g. periodicities, transmission type etc.), and/or the like. It will be appreciated that any of the system information related functions described as being performed by the base station 5 may be performed by another entity in the communication network and (where appropriate) appropriate signalling to the UE/base station used to inform the UE/base station of any related data. For example, periodicities could be calculated by the other entity and informed to the base station 5 (which may inform the UE 3 of the periodicity in turn) and/or UE 3. Similarly, the transition between on-demand and periodic OSI may be managed by the other entity and informed to the base station and/or UE. In these examples the other entity may be similar to the base station 5 shown in FIG. 5 with a controller, transceiver, memory and the like.

In summary, therefore, a communication apparatus is described that comprises: a controller and a transceiver; wherein the controller is configured to: control transmission of system information, by the transceiver, in at least one cell operated by the communication apparatus, using: a periodic transmission mode in which at least part of said system information is transmitted at a regular periodic interval; and an on-demand transmission mode in which at least part of said system information is transmitted, following a request for system information from at least one communication device in said cell; determine a utilisation level representing an extent to which said on-demand transmission mode is being, or will be, utilised by the at least one communication device; and switch, based on said determined utilisation level, between using said on-demand transmission mode, and not using said on-demand transmission mode, for transmitting at least a given part of said system information.

The controller may be configured to determine when to perform said switch based on a comparison of said determined utilisation level with at least one utilisation threshold.

The controller may be configured to determine: (a) when to switch from using said on-demand transmission mode; to not using said on-demand transmission mode based on a comparison of said determined utilisation level with a first threshold (e.g. $TH_{OFF}$); and (b) when to switch from not using said on-demand transmission mode; to using said on-demand transmission mode based on a comparison of said determined utilisation level with a second threshold (e.g. $TH_{ON}$).

The controller may be configured to determine said utilisation level based on a rate (e.g. an arrival rate) at which communication devices are, or will be, making requests for said at least a given part of said system information.

The controller may be configured to determine when to switch from using said on-demand transmission mode to not using said on-demand transmission mode based on a determined utilisation level that has been measured.

The controller may be configured to determine when to switch from not using said on-demand transmission mode to using said on-demand transmission mode based on at least one of: a determined utilisation level that has been measured; and a determined utilisation level that has been estimated.

The controller may be further configured to control the transceiver to inform the at least one communication device whether use of said on-demand transmission mode, for transmitting said at least a given part of said system information, is switched on or off.

The controller may be configured to control the transceiver to inform the at least one communication device whether use of said on-demand transmission mode is switched on or off for said at least a given part of said system information using at least one of: another part of said system information; and downlink control information (e.g. using a downlink control information (DCI) format).

The controller may be configured to control the transceiver: to inform the at least one communication device that use of said on-demand transmission mode is switched on, for said at least a given part of said system information, by transmitting, to the at least one communication device, information identifying resources assigned for requesting said at least a given part of said system information; and to inform the at least one communication device that use of said on-demand transmission mode is switched off, for said at least a given part of said system information, by not transmitting, to the at least one communication device, information identifying resources assigned for requesting said at least a given part of said system information.

The controller may be further configured to assign a first resource, for use by the at least one communication device to transmit requests for a first part of system information that is transmitted on-demand, and a second resource, for use by the at least one communication device to transmit requests for a second part of system information that is transmitted on-demand.

The controller may be further configured: to control the transceiver to receive at least one request, for system information that is transmitted on-demand from at least one communication device; and to determine what part of the system information should be transmitted responsive to the at least one request based on resources used by the at least one communication device making the request.

The controller is further configured: to control the transceiver to receive at least one request, for system information that is transmitted on-demand from at least one communication device; and to determine what part of the system information should be transmitted responsive to the at least one request based on a timing of the request by the at least one communication device making the request.

The controller, when using the on-demand transmission mode, may be configured to control the timing of transmissions of requested system information to coincide with transmission opportunities configured to occur at regular periodic intervals, wherein the requested system information is transmitted in at least one of said transmission opportunities following at least one request for that system information.

The controller may be configured to configure at least one periodicity, for the regular periodic intervals between said transmission opportunities, to target a required utilisation level (e.g. as represented by an optimum utilisation threshold).

The controller may be configured: to configure a first periodicity, for the regular periodic intervals between said transmission opportunities, for transmission of system information to at least one communication device having a first latency requirement; and to configure a second periodicity (different to said first periodicity), for the regular periodic intervals between said transmission opportunities, for transmission of system information to at least one communication device having a second latency requirement.

In a further summary, therefore, a communication apparatus is described that comprises: a controller and a transceiver; wherein the controller is configured to: control reception, by the transceiver, of system information transmitted in a cell by communication apparatus, wherein said system information is transmitted using at least one of: a periodic transmission mode in which at least part of said system information is transmitted at a regular periodic interval; and an on-demand transmission mode in which at least part of said system information is transmitted, following a request for system information from at least one communication device in said cell; identifying what system information is required for which use of said on-demand transmission mode is switched on; and control transmission, by the transceiver, of a request for the identified system information; wherein the controller is configured to control the timing said request based on what system information has been identified as being required.

The controller may be configured to determine an interval to wait before repeating a request for the identified system information.

The controller may be configured to control the transceiver to receive information identifying a periodicity of transmission opportunities for transmission of system information on-demand, and wherein said interval is dependent on said periodicity.

The controller may be configured to identify for how many consecutive transmission opportunities an attempt should be made to decode system information for which a request has been transmitted; and wherein said interval is dependent on said periodicity.

The controller may be configured to determine whether use of said on-demand transmission mode is switched on for a given part of said system information implicitly based on whether resources have been assigned for requesting the given part of said system information.

Various other modifications will be apparent to those skilled in the art and will not be described in further detail here.

This application is based upon and claims the benefit of priority from United Kingdom patent application No. 1700267.6, filed on Jan. 6, 2017, the disclosure of which is incorporated herein in its entirety by reference.

The invention claimed is:

1. A user equipment (UE) comprising:
a controller; and
a transceiver;
wherein the controller is configured to:
control the transceiver to receive, from a communication apparatus, minimum system information including at least a master information block (MB) and a system information block type 1 (SIB1);
control the transceiver to receive, from the communication apparatus, other system information (SI), wherein the other SI is broadcast using one of:
a periodic transmission mode in which the other SI is being broadcast on a periodic basis; and
an on-demand transmission mode in which the other SI is broadcast on-demand, after requesting for the other SI from at least one UE,
wherein the SIB1 includes an indication explicitly indicating whether the other SI is being broadcast or not, and
wherein, in a case where the indication indicates that the other SI is not being broadcast, the SIB1 includes configuration information for the UE to request for the other SI;
request for the other SI by initiating a Random Access Channel (RACH) procedure using the configuration information; and
control the transceiver to receive information indicating a period for waiting for a next requesting, via a dedicated signaling.

2. The UE according to claim 1, wherein the configuration information includes a periodicity for requesting for the other SI.

3. The UE according to claim 1, wherein the configuration information includes information indicating a resource for requesting for the other SI.

4. The UE according to claim 1, wherein the configuration information includes information indicating a transmission occasion for the RACH procedure.

5. A communication apparatus comprising:
a controller; and
a transceiver;
wherein the controller is configured to:
control the transceiver to transmit minimum system information including at least a master information block (MIB) and a system information block type 1 (SIB1);
control the transceiver to broadcast other system information (SI) using one of:
a periodic transmission mode in which the other SI is being broadcast on a periodic basis; and
an on-demand transmission mode in which the other SI is broadcast on-demand, after requesting for the other SI from a User Equipment (UE), and
wherein the SIB1 includes an indication explicitly indicating whether the other SI is being broadcast or not, and
wherein, in a case where the indication indicates that the other SI is not being broadcast, the SIB1 includes configuration information for the UE to request for the other SI;
control the transceiver to receive a request for the other SI by the UE initiating a Random Access Channel (RACH) procedure using the configuration information; and
control the transceiver to transmit, to the UE, information indicating a period for waiting for a next requesting by the UE, via a dedicated signaling.

6. A method performed by a communication apparatus, the method comprising:
transmitting minimum system information including at least a master information block (MIB) and a system information block type 1 (SIB1);
broadcasting other system information (SI) using one of:
a periodic transmission mode in which the other SI is being broadcast on a periodic basis; and
an on-demand transmission mode in which the other SI is broadcast on-demand, after requesting for the other SI from a User Equipment (UE),
wherein the SIB1 includes an indication explicitly indicating whether the other SI is being broadcast or not, and
wherein in a case where the indication indicates that the other SI is not being broadcast, the SIB1 includes configuration information for the UE to request for the other SI;
receiving a request for the other SI by the UE initiating a Random Access Channel (RACH) procedure using the configuration information; and
transmitting, to the UE, information indicating a period for waiting for a next requesting by the UE, via a dedicated signaling.

7. A method performed by a user equipment (UE), the method comprising:
receiving, from a communication apparatus, minimum system information including at least a master information block (MIB) and a system information block type 1 (SIB1);
receiving, from the communication apparatus, other system information (SI), wherein the other SI is broadcast using one of:
a periodic transmission mode in which the other SI is being broadcast on a periodic basis; and
an on-demand transmission mode in which the other SI is broadcast on-demand, after requesting for the other SI from at least one UE,
wherein the SIB1 includes an indication explicitly indicating whether the other SI is being broadcast or not, and
wherein, in a case where the indication indicates that the other SI is not being broadcast, the SIB1 includes configuration information for the UE to request for the other SI;
requesting for the other SI by initiating a Random Access Channel (RACH) procedure using the configuration information; and
receiving information indicating a period for waiting for a next requesting, via a dedicated signaling.

* * * * *